(12) United States Patent
Yoshihara et al.

(10) Patent No.: US 10,514,870 B2
(45) Date of Patent: Dec. 24, 2019

(54) IMAGE FORMING APPARATUS THAT EXECUTES JOBS, CONTROL METHOD THEREFOR, AND STORAGE MEDIUM

(71) Applicant: CANON KABUSHIKI KAISHA, Tokyo (JP)

(72) Inventors: Toshio Yoshihara, Abiko (JP); Yoshihisa Nomura, Kashiwa (JP); Masanori Ichikawa, Tokyo (JP); Shigeki Hasui, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/136,564

(22) Filed: Sep. 20, 2018

(65) Prior Publication Data
US 2019/0095141 A1   Mar. 28, 2019

(30) Foreign Application Priority Data

Sep. 27, 2017 (JP) .................. 2017-186774

(51) Int. Cl.
*G06F 3/12*      (2006.01)
*H04N 1/00*     (2006.01)
*G06F 3/0488*  (2013.01)

(52) U.S. Cl.
CPC .......... *G06F 3/1205* (2013.01); *G06F 3/0488* (2013.01); *G06F 3/1253* (2013.01); *H04N 1/00177* (2013.01)

(58) Field of Classification Search
CPC .... G06F 3/1205; G06F 3/0488; G06F 3/1253; H04N 1/00177

USPC ........................................................ 358/1.15
See application file for complete search history.

(56) References Cited

U.S. PATENT DOCUMENTS

| | | | |
|---|---|---|---|
| 8,514,440 B2* | 8/2013 | Kuramochi | G06F 21/608 358/1.1 |
| 2009/0303528 A1* | 12/2009 | Takeuchi | G06F 21/608 358/1.15 |
| 2014/0056607 A1* | 2/2014 | Maeda | G03G 15/50 399/75 |
| 2015/0261481 A1* | 9/2015 | Takenaka | G06F 3/1285 358/1.15 |
| 2017/0075633 A1* | 3/2017 | Sawamura | G06F 3/121 |
| 2017/0187922 A1* | 6/2017 | Koizumi | H04N 1/00204 |

FOREIGN PATENT DOCUMENTS

JP     2001306204 A    11/2001

* cited by examiner

*Primary Examiner* — Allen H Nguyen
(74) *Attorney, Agent, or Firm* — Rossi, Kimms & McDowell LLP

(57) ABSTRACT

An image forming apparatus which is capable of preventing degradation of operability associated with setting of job setting information. The image forming apparatus is unable to directly edit the job setting information required to execute a submitted job. The submitted job is executed based on the job setting information. In a case where user-specific setting information corresponding to identification information on a user who has logged into the image forming apparatus and corresponding to a type of the submitted job is registered in the image forming apparatus, the user-specific setting information is set as the job setting information.

7 Claims, 27 Drawing Sheets

FIG. 8

| OPERATION | COLOR/ MONOCHROME | ZOOM-IN/ ZOOM-OUT | SHEET SIZE | FINISH | DOUBLE-SIDED/ ONE-SIDED | RESOLUTION | NUMBER OF COPIES |
|---|---|---|---|---|---|---|---|
| COPY | MONOCHROME | 100% | AUTO | SORT | DOUBLE-SIDED | 300dpi | 1 |
| SCAN | AUTO | 100% | AUTO | — | ONE-SIDED | 200dpi | — |
| FAX | — | 100% | AUTO | — | ONE-SIDED | 200dpi | — |

| USER IDENTIFICATION NUMBER | USER NAME | OPERATION | COLOR/ MONOCHROME | ZOOM-IN/ ZOOM-OUT | SHEET SIZE | FINISH | DOUBLE-SIDED/ ONE-SIDED | RESOLUTION | NUMBER OF COPIES | 1 JOB |
|---|---|---|---|---|---|---|---|---|---|---|
| 001 | ABC | COPY | COLOR | 100% | AUTO | SORT | DOUBLE-SIDED | 300dpi | 10 | YES |
| 002 | DEF | SCAN | AUTO | 100% | AUTO | — | ONE-SIDED | 600dpi | — | NO |

*FIG. 21A*

PRINTER NAME: MFP3
DETAILED SETTINGS
STATUS: PREPARATION COMPLETED

PRINT RANGE: ● ALL
○ PAGES
FROM: 1
TO:

NUMBER OF COPIES: 1 COPIES

OK  CANCEL

*FIG. 21B*

FAVORITE: STANDARD SETTING
OUTPUT METHOD: SECURE PRINT

ORIGINAL SIZE: A4
OUTPUT SHEET SIZE: SAME AS ORIGINAL SIZE
PAGE LAYOUT: 2in1
ONE-SIDED/DOUBLE-SIDED: ONE-SIDED PRINTING

OK  CANCEL

FIG. 22

| MODEL | BUTTON INFORMATION |
|---|---|
| MFP11 | COPY<br>SCAN<br>PRINT<br>FAX |
| MFPX | COPY<br>SCAN<br>PRINT |
| MFPY | COPY<br>SCAN<br>PRINT |

2201

IMAGE FORMING APPARATUS THAT EXECUTES JOBS, CONTROL METHOD THEREFOR, AND STORAGE MEDIUM

BACKGROUND OF THE INVENTION

Field of the Invention

The present invention relates to an image forming apparatus, a control method therefor, and a storage medium.

Description of the Related Art

An MFP which is an image processing apparatus executing jobs such as copying, scanning, and printing is known. The MFP has an operating unit including an LCD (liquid crystal display) and a plurality of operating buttons (see, for example, Japanese Laid-Open Patent Publication (Kokai) No. 2001-306204). To execute, for example, a copy job, a user places an original on the MFP, configures setting information such as the number of copies and a sheet size (hereafter referred to as "job setting information") for use in executing the copy job via a setting screen displayed on the LCD and then issues an instruction to execute the copy job.

On the other hand, there has lately been a high demand for inexpensive MFPs, and hence an MFP equipped with no LCD has appeared on the market (hereafter referred to as "the MFP with no LCD"). In the MFP with no LCD, the setting screen cannot be displayed on the operating unit, and hence the user cannot edit job setting information using the operating unit. Thus, for the MFP with no LCD, the user sets job setting information using another apparatus, for example, a PC capable of communicating with the MFP with no LCD and gives an instruction to execute a job using the operating unit of the MFP.

However, the user is closer to the MFP with no LCD than to the PC, and therefore, even in a situation where the MFP with no LCD is easier to use than the PC, job setting information needs to be set using the PC. For this reason, the conventional the MFP with no LCD has a problem of degradation in operability associated with setting of job setting information.

SUMMARY OF THE INVENTION

The present invention provides an image forming apparatus and a control method therefor, which are capable of preventing degradation of operability associated with setting of job setting information, as well as a storage medium.

Accordingly, the present invention provides an image forming apparatus that is unable to directly edit job setting information required to execute a submitted job, comprising, a setting unit configured to set the job setting information, and an execution unit configured to execute the submitted job based on the set job setting information, wherein in a case where user-specific setting information corresponding to identification information on a user who has logged into the image forming apparatus and the user-specific setting information corresponding to a type of the submitted job is registered in the image forming apparatus, the setting unit sets the user-specific setting information as the job setting information.

According to the present invention, degradation of operability associated with setting of job setting information is prevented.

Further features of the present invention will become apparent from the following description of exemplary embodiments (with reference to the attached drawings).

BRIEF DESCRIPTION OF THE DRAWINGS

FIG. 8 is a view showing an example of default setting registration information which is managed by the MFP in FIG. 1.

FIG. 10 is a view showing an example of user setting management information which is managed by the MFP in FIG. 1.

FIG. 21A is a view showing an example of a setting screen which is displayed on the PC in FIG. 1.

FIG. 21B is a view showing an example of a detailed setting screen which is displayed on the PC in FIG. 1.

FIG. 22 is a view showing an example of operating button management information which is managed by the PC in FIG. 1.

DESCRIPTION OF THE EMBODIMENTS

Hereafter, an embodiment of the present invention will be described in detail with reference to the drawings.

In the following description of the present embodiment, it is assumed that the present invention is applied to an MFP which is an image forming apparatus, but the present invention should not always be applied to the MFP but may be applied to apparatuses that are not equipped with an operating unit on which job setting information required to execute a job is edited.

Figure 1:
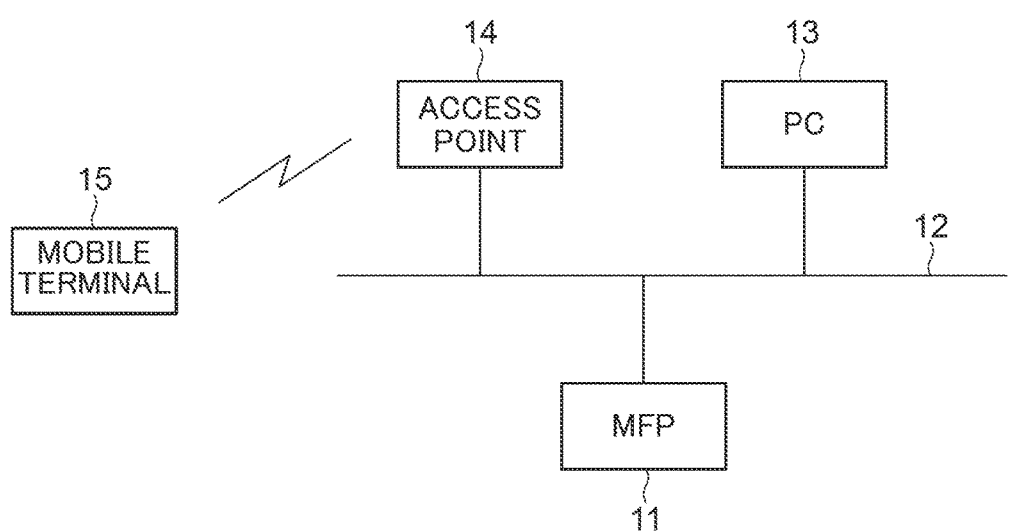
FIG. 1 is a diagram useful in explaining a network arrangement of an MFP which is an information forming apparatus according to an embodiment of the present invention.

FIG. 1 is a diagram useful in explaining a network arrangement of an MFP 11 which is the image forming apparatus according to the embodiment of the present invention.

Referring to FIG. 1, the MFP 11 as well as a PC 13 and an access point 14 constitutes a LAN 12. In the LAN 12, the MFP 11 carries out wired LAN communications with the PC 13, which is connected to the LAN 12 via a LAN cable (not shown), and also carries out wireless LAN communications with a mobile terminal 15, which is connected to the LAN 12 via the access point 14.

In response to an executing instruction given by a user, the MFP 11 executes a job such as copying, scanning, or printing. The user instructs the MFP 11 to execute a job by means of an operating unit 204 in FIG. 2, to be described later, but the operating unit 204, to be described later, has a simple arrangement with minimum functions, and therefore, the user cannot directly configure job setting information from the MFP 11. Accordingly, in the present embodiment, when the user causes the MFP 11 to execute a job, he or she configures job setting information by means of the PC 13 or the like and issues an instruction to execute the job by means of the operating unit 204, to be described later, of the MFP 11.

Figure 2:
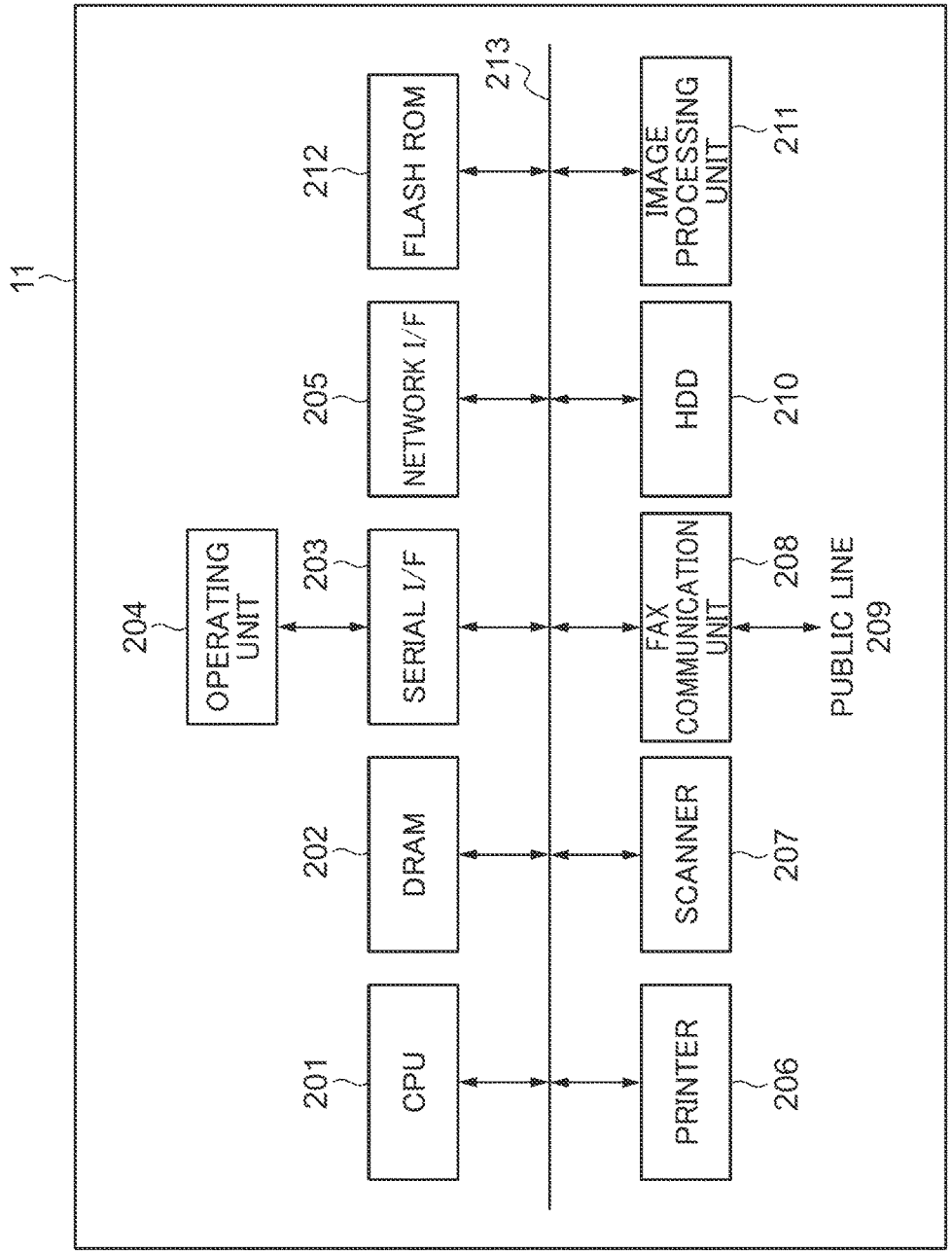
FIG. 2 is a block diagram schematically showing an arrangement of the MFP in FIG. 1.

FIG. 2 is a block diagram schematically showing an arrangement of the MFP 11 in FIG. 1.

Referring to FIG. 2, the MFP 11 has a CPU 201, a DRAM 202, a serial I/F 203, the operating unit 204, a network I/F 205, a printer 206, a scanner 207, a fax communication unit 208, an HDD 210, an image processing unit 211, and a flash ROM 212. The CPU 201, the DRAM 202, the serial I/F 203, the network I/F 205, the printer 206, the scanner 207, the fax communication unit 208, the HDD 210, the image processing unit 211, and the flash ROM 212 are connected to one another via a system bus 213.

The CPU 201 integratedly controls the entire MFP 11. The DRAM 202 stores programs to be executed by the CPU 201. The DRAM 202 is also used as a temporary storage area for data. The serial I/F 203 connects the operating unit 204 and the system bus 213 together. The operating unit 204 has only minimum functions and notifies the CPU 201 of details on operations performed by the user via the serial I/F 203. It should be noted that an arrangement of the operating unit 204 will be described later in detail. The network I/F 205 carries out data communications with external apparatuses such as the PC 13 and the mobile terminal 15. The printer 206 prints, for example, scanned images, which are generated by the scanner 207, on sheets. The scanner 207 optically reads originals, and based on read information, generates scanned images. The fax communication unit 208 carries out facsimile communications with external apparatuses via a public line 209. The HDD 210 stores programs to be executed by the CPU 201. The HDD 210 is used as a spool area for jobs. The image processing unit 211 carries out a conversion process in which it converts print data received from an external apparatus into data printable by the printer 206. The image processing unit 211 also subjects scanned images generated by the scanner 207 to processing such as noise removal, color space conversion, rotation, and compression. The flash ROM 212 stores programs to be executed by the CPU 201. The flash 212 also stores default setting management information 801 in FIG. 8 and user setting management information 1001 in FIG. 10.

Figure 3:
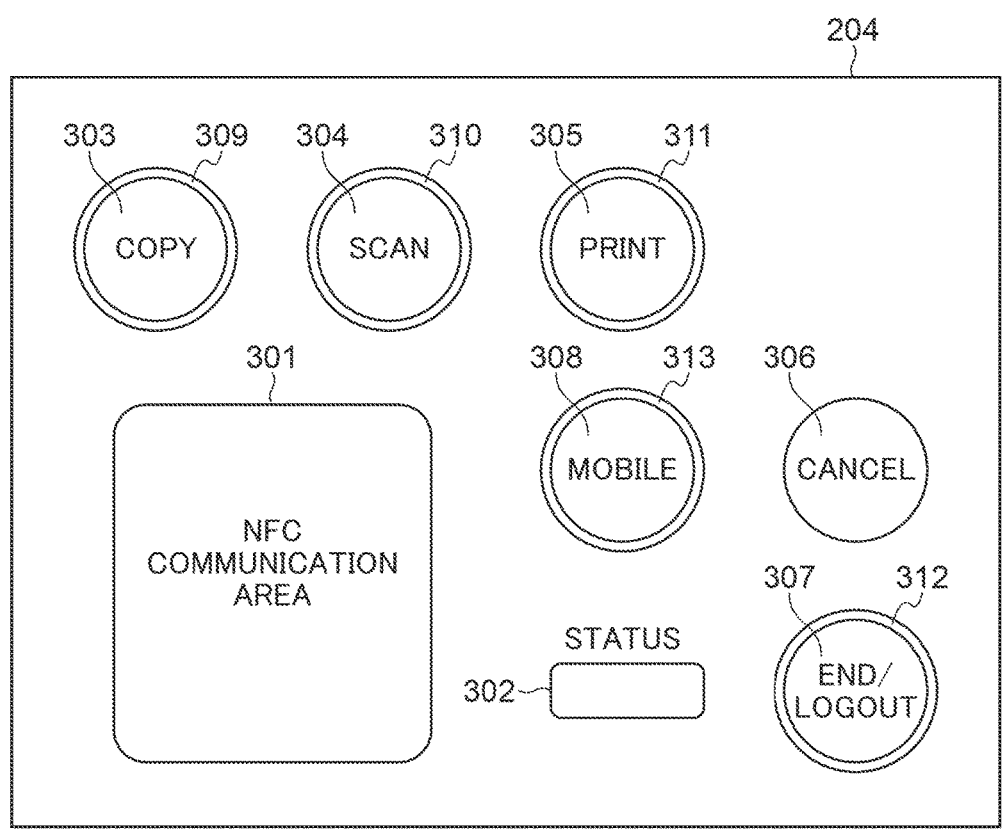
FIG. 3 is a view showing an appearance of an operating unit in FIG. 2.

FIG. 3 is a view showing an appearance of the operating unit 204 in FIG. 2.

Referring to FIG. 3, the operating unit 204 has an NFC (near-field radio communication) communication area 301, a status LED 302, and a plurality of operating buttons (executing instruction receiving unit). Specifically, the plurality of operating buttons consists of a copy button 303, a scan button 304, a print button 305, a cancel button 306, an end/logout button 307, and a mobile button 308. In the operating unit 204, LEDs 309 to 312 (executing instruction receiving units) for the copy button 303, the scan button 304, the print button 305, the end/logout button 307, and the mobile button 308 are placed in a such a manner as to cover the peripheries of the respective operating buttons. It should be noted that the operating unit 204 has no display unit that is able to display a setting screen on which job setting information is configured.

The NFC communication area 301 serves as a mark indicative of a place over which a near-field wireless communication device should be held. An antenna 403 and an NFC tag 405 in FIG. 4, to be described later, are placed at positions overlapping the NFC communication area 301 as the NFC communication area 301 is seen from outside the MFP 11. For example, when the user brings a contactless card (not shown) close to the NFC communication area 301, a near-field wireless communication conforming to NFC communication standards (hereafter referred to as "the NFC communication") is carried out between the contactless card and the MFP 11. The MFP 11 reads information set in the contactless card via the NFC communication. Also, when the user brings the mobile terminal 15 close to the NFC communication area 301, the mobile terminal 15 obtains network information written in the NFC tag 405 in FIG. 4 via the NFC communication. The network information is required to carry out a wireless communications such as a Wi-Fi communication at a higher speed than the NFC communication, and for example, an IP address and an SSID of the MFP 11. The status LED 302 provides notifications about statues of the MFP 11 by means of colors that light up. For example, when the MFP 11 is in a normal state, the status LED 302 lights up in green. When the MFP 11 is in an abnormal state, the status LED 302 lights up in red.

The copy button 303 is an operating button for issuing an instruction to perform copying. The scan button 304 is an operating button for issuing an instruction to perform scanning. The print button 305 is an operating button for issuing an instruction to perform printing. The cancel button 306 is an operating button for issuing an instruction to cancel a job submitted to the MFP 11. The end/logout button 307 is an operating button for issuing an instruction to log out of the MFP 11. The mobile button 308 is an operating button for issuing an instruction to provide notification about the network information. When the mobile button 308 is selected, for example, a sheet on which the network information is printed is output.

The LEDs 309 to 313 provide notifications about states of the corresponding operating buttons. For example, the LEDs 309 to 313 light up when the corresponding operating buttons are ready to be operated, and they do not light up when the corresponding operating buttons are not ready to be operated. In the following description, the LED 309 corresponding to the copy button 303 is referred to as the copy LED 309. The LED 310 corresponding to the scan button 304 is a referred to as the scan LED 310. The LED 311 corresponding to the print button 305 is referred to as the print LED 311. The LED 312 corresponding to the end/logout button 307 is referred to as the end/logout LED 312.

The LED 313 corresponding to the mobile button 308 is referred to as the mobile LED 313. 312. The LED 313 corresponding to the mobile button 308 is referred to as the scan LED 313.

Figure 4:
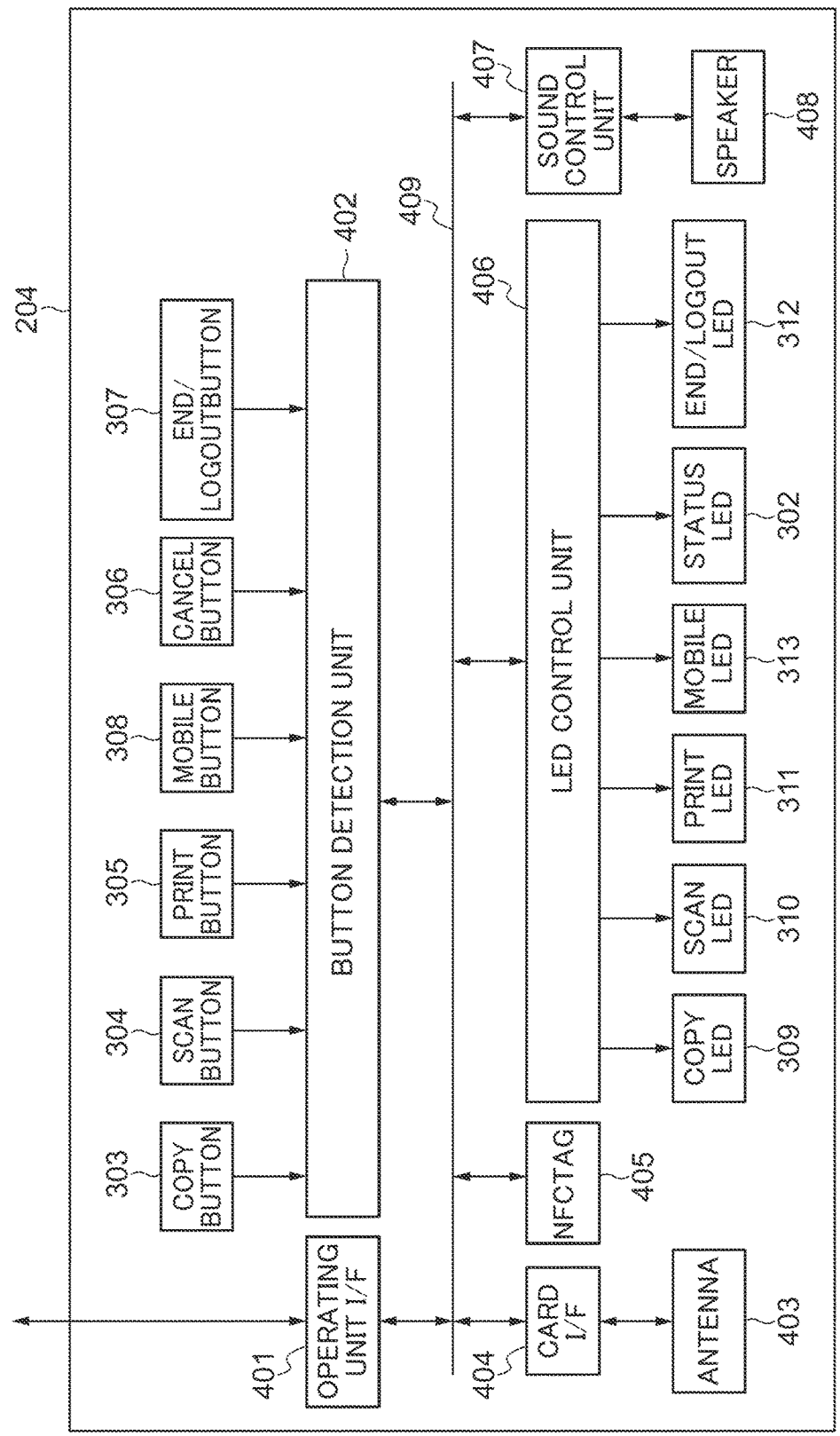
FIG. 4 is a block diagram schematically showing an internal arrangement of the operating unit in FIG. 2.

FIG. 4 is a block diagram schematically showing an internal arrangement of the operating unit 204 in FIG. 2.

Referring to FIG. 4, the operating unit 204 has, in addition to the components in FIG. 3, an operating unit I/F 401, a button detection unit 402, the antenna 403, a card I/F 404, the NFC tag 405, an LED control unit 406, a sound control unit 407, and a speaker 408. The operating unit I/F 401, the button detection unit 402, the card I/F 404, the NFC tag 405, the LED control unit 406, and the sound control unit 407 are connected to one another via an internal signal bus 409. The copy button 303, the scan button 304, the print button 305, the cancel button 306, the end/logout button 307, and the mobile button 308 are connected to the button detection unit 402. The antenna 403 is connected to the card I/F 404. The status LED 302, the copy LED 309, the scan LED 310, the print LED 311, the end/logout LED 312, and the mobile LED 313 are connected to the LED control unit 406. The speaker 408 is connected to the sound control unit 407.

The operating unit I/F 401 connects the internal signal bus 409 and the serial I/F 203 together. The button detection unit 402 detects on-off states of the respective operating buttons and notifies the CPU 201 of the detection results via the operating unit I/F 401. The antenna 403 is electromagnetically coupled to a contactless card put close to the NFC communication area 301. This enables the MFP 11 to carry out the NFC communication with the contactless card. The card I/F 404 reads information configured in the contactless card by the NFC communication. For example, a user identification number (information that identifies a user), which is set when the contactless card is manufactured, is configured in the contactless card. The card I/F 404 notifies the CPU 201 of the read user identification number and also writes the user identification number in the DRAM 202. The NFC tag 405 stores the network information. The LED control unit 406 controls turning on-off of each LED connected thereto. The sound control unit 407 controls output of sound from the speaker 408 based on control signals received from the CPU 201. The speaker 408 outputs an audio guidance and sounds an alert or the like when an error is detected.

Figure 5:
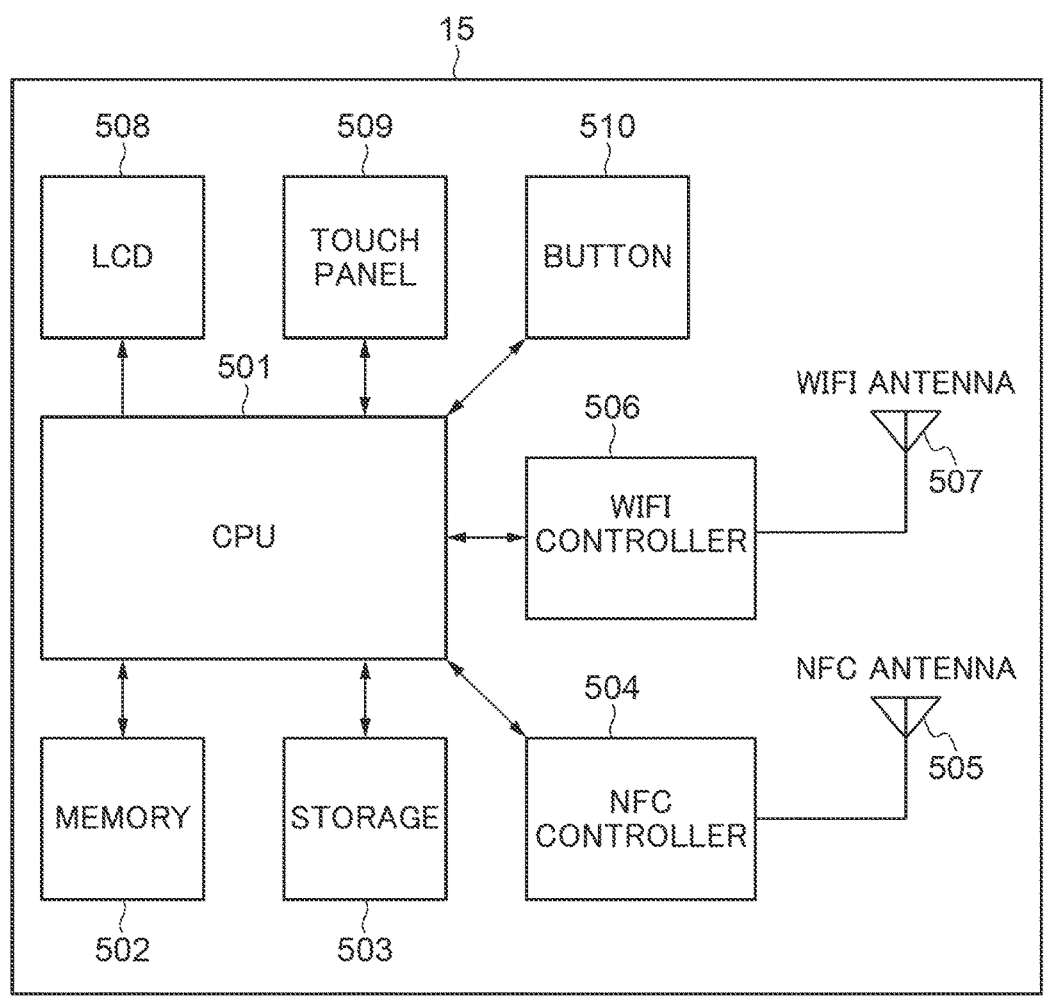
FIG. 5 is a block diagram schematically showing an arrangement of a mobile terminal in FIG. 1.

FIG. 5 is a block diagram schematically showing an arrangement of the mobile terminal 15 in FIG. 1.

Referring to FIG. 5, the mobile terminal 15 has a CPU 501, a memory 502, a storage 503, an NFC controller 504, an NFC antenna 505, a Wi-Fi controller 506, a Wi-Fi antenna 507, an LCD 508, a touch panel 509, and buttons 510. The CPU 501 is connected to the memory 502, the storage 503, the NFC controller 504, the Wi-Fi controller 506, the LCD 508, the touch panel 509, and the buttons 510. The NFC antenna 505 is connected to the NFC controller 504. The Wi-Fi antenna 507 is connected to the Wi-Fi controller 506.

Figure 16:
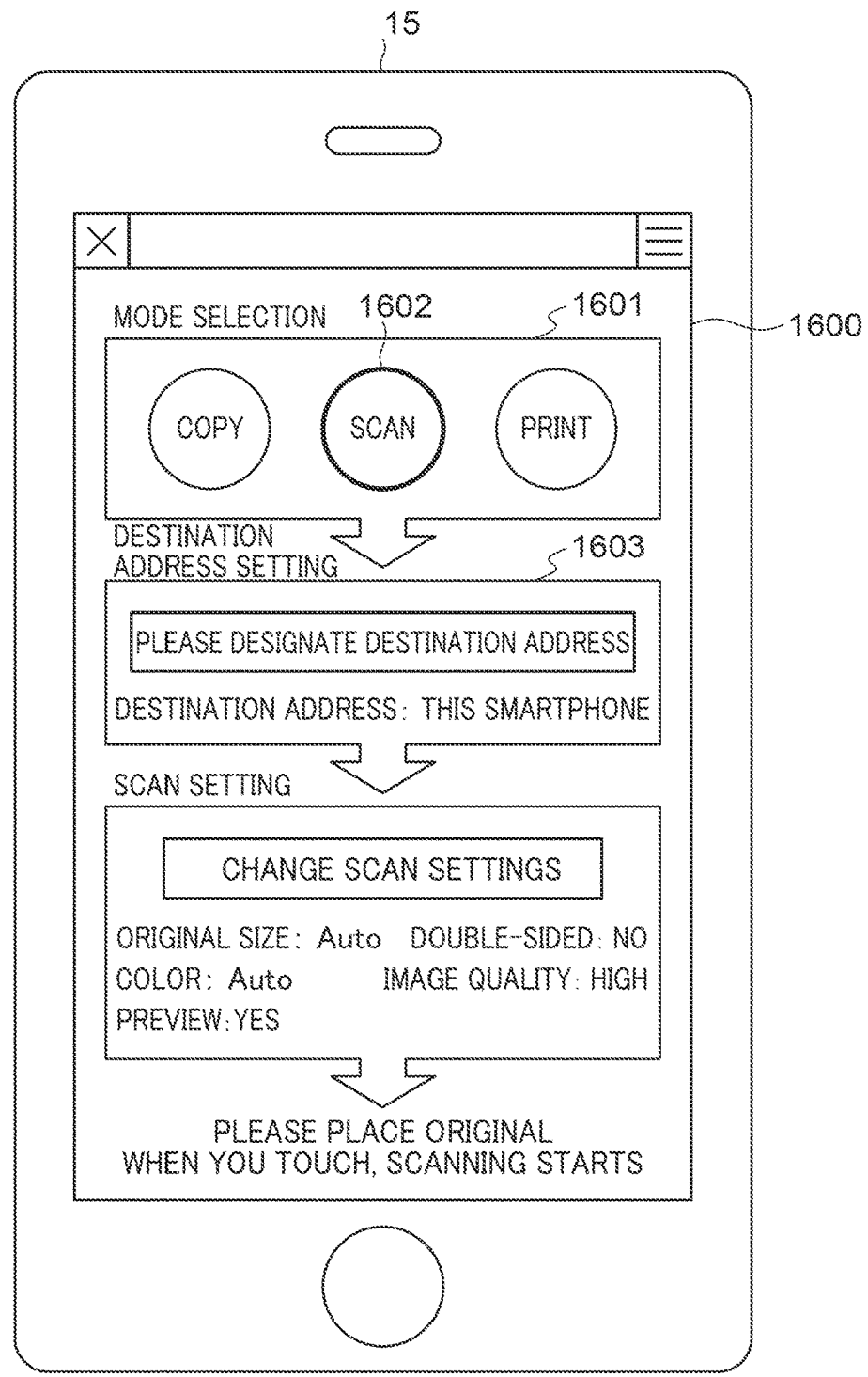
FIG. 16 is a view showing an example of a setting screen displayed on the mobile terminal in FIG. 1.

The CPU 501 integratedly controls the entire mobile terminal 15. The memory 502 is used as a work area for the CPU 501 and also used as a temporary storage area for each piece of data. The storage 503 is a nonvolatile memory and stores programs and data. The NFC controller 504 carries out the NFC communication with the MFP 11 via the NFC antenna 505. The Wi-Fi controller 506 carries out wireless communications with the MFP 11 via the Wi-Fi antenna 507. The LCD 508 displays screen data generated by the CPU 501. The screen data is, for example, data for displaying a setting screen 1600 in FIG. 16, to be described later, via which the MFP 11 is instructed to execute a job. The touch panel 509 is placed in such a manner as to cover the surface of the LCD 508. When the user touches a button or the like displayed on the LCD 508, touch coordinates indicating a position touched by the user are sent to the CPU 501 in the mobile terminal 15. The buttons 510 are, for example, a power button for turning on and off the power to the mobile terminal 15 and a home button for returning to a home screen.

Figure 6A:
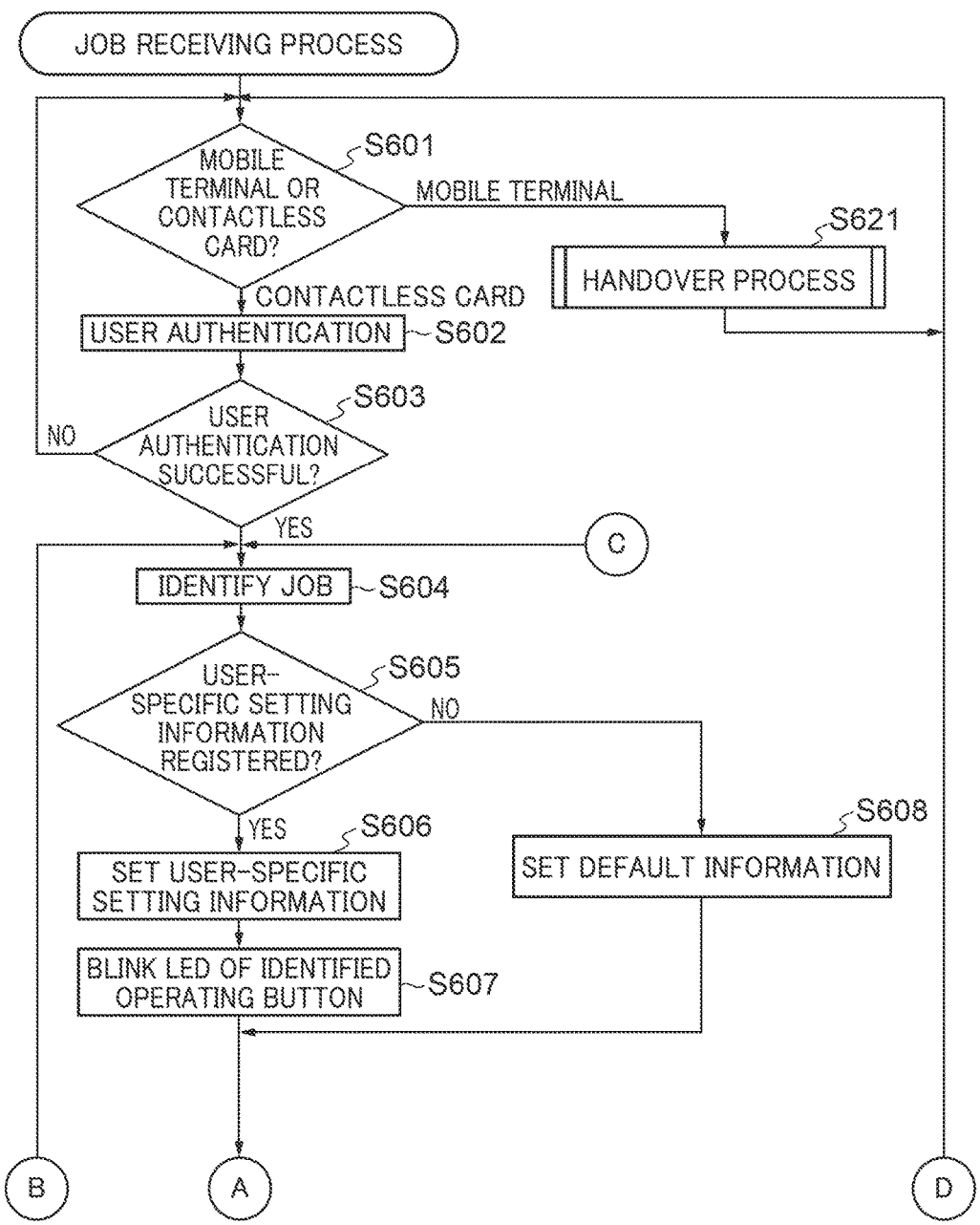
FIGS. 6A and 6B is a flowchart showing the procedure of a job receiving process which is carried out by the MFP in FIG. 1.
Figure 6B:
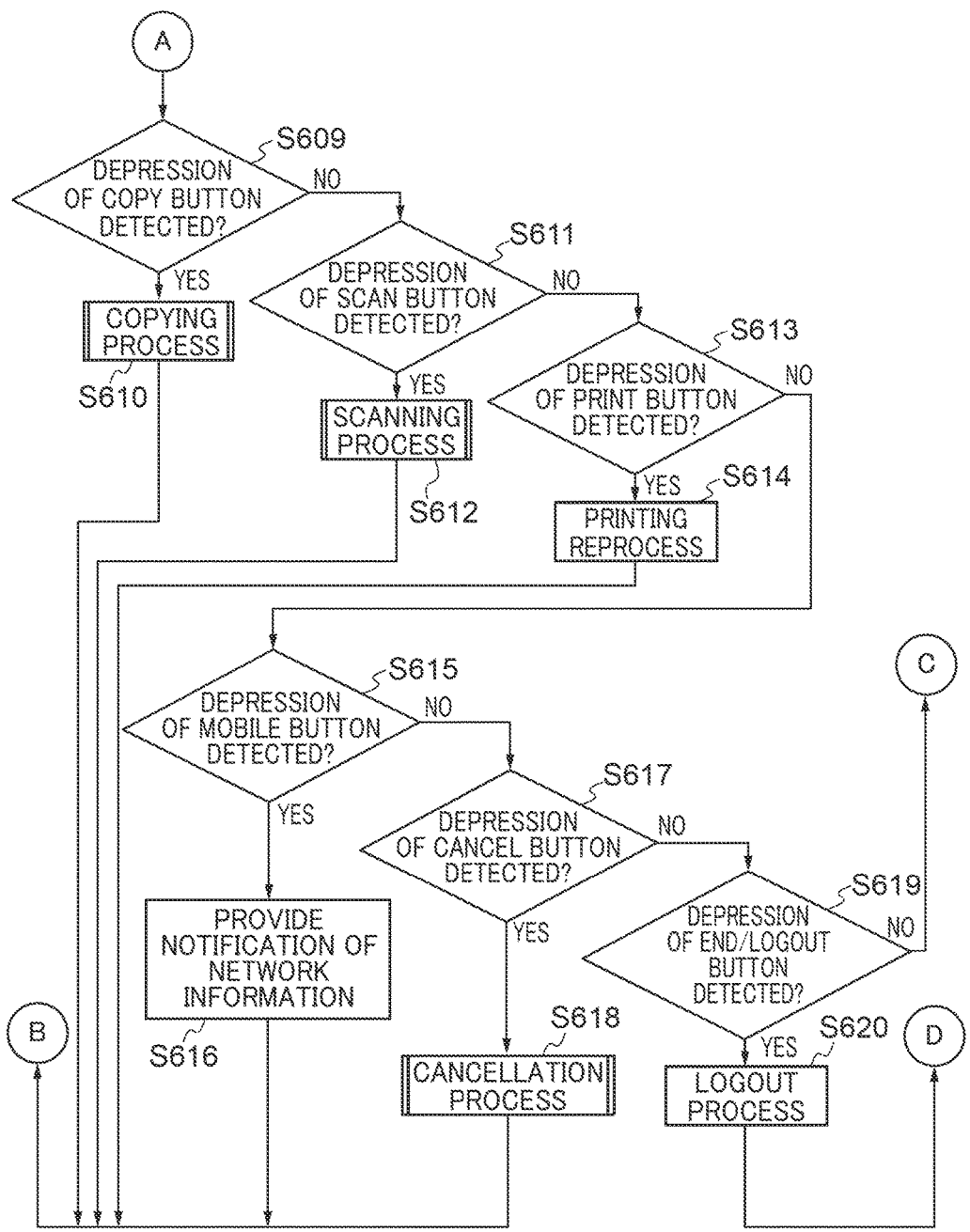

FIGS. 6A and 6B is a flowchart showing the procedure of a job receiving process which is carried out by the MFP 11 in FIG. 1.

Figure 7:
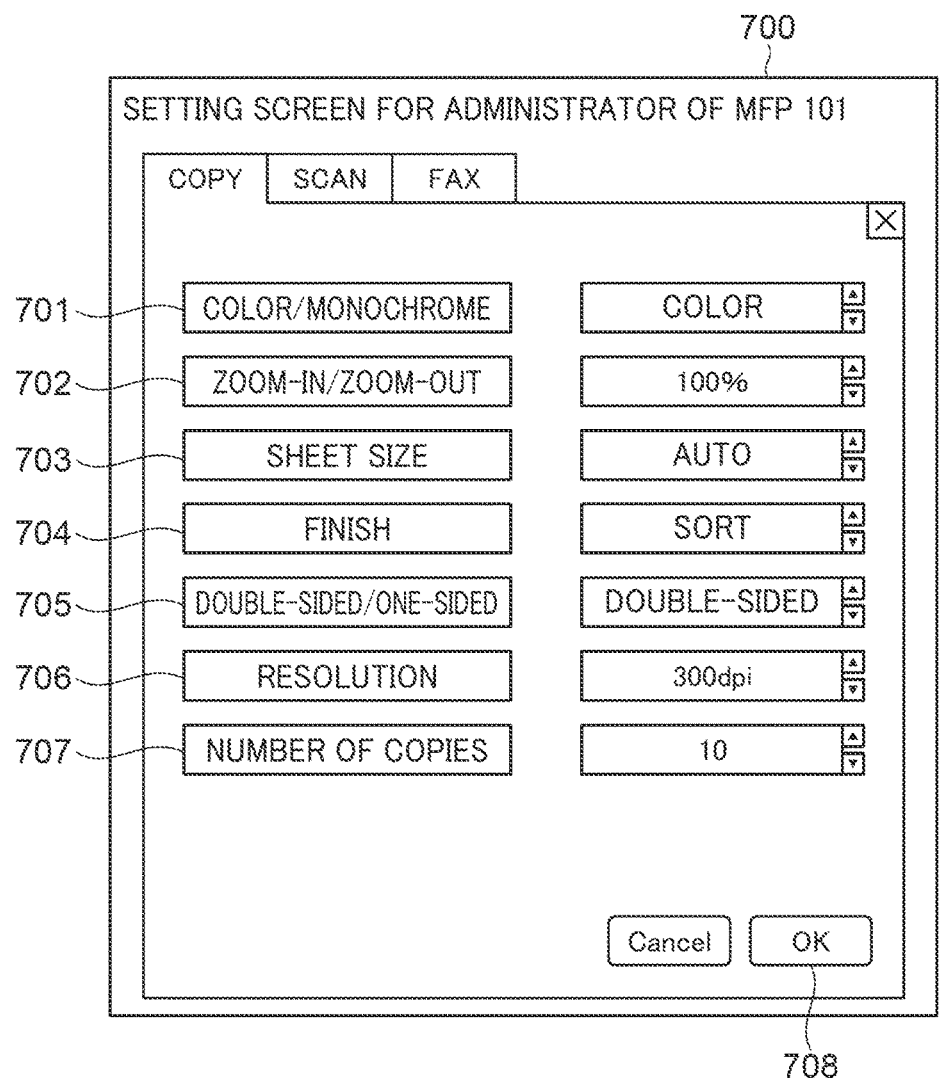
FIG. 7 is a view showing an example of a default setting registration screen which is displayed on a PC in FIG. 1.

The process in FIGS. 6A and 6B is implemented by the CPU 201 executing programs stored in the flash ROM 212. The process in FIGS. 6A and 6B is carried out when the CPU 201 detects a near-field wireless communication device put close to the NFC communication area 301. The process in FIGS. 6A and 6B is based on the assumption that a plurality of jobs is submitted to the MFP 11, and an administrator of the MFP 11 registers in advance from PC 13 default information (standard setting information), which is job setting information common to all users who use the MFP 11. When the administrator of the MFP 11 successfully performs user authentication using the PC 13, a default setting registration screen 700 in FIG. 7 is displayed on the PC 13. The default setting registration screen 700 is displayed on a web browser of the PC 13. The administrator of the MFP 11 uses the default setting registration screen 700 to register and change default information with respect to each of job types such as copying, scanning, and printing. On the default setting registration screen 700, for example, default information comprised of color/monochrome 701, zoom in/zoom out 702, sheet size 703, finish 704, double-sided/one-sided 705, resolution 706, and the number of copies 707 is registered. When setting values for the respective items are input, and an OK button 708 is selected, the input setting values are registered in default setting management information 801. The default setting management information 801 manages the default information with respect to each job type. The default setting management information 801 is managed by the MFP 11 and stored in the flash ROM 212 of the MFP 11.

Referring to FIGS. 6A and 6B, first, the CPU 201 determines whether the detected near-field wireless communication device is a mobile terminal or a contactless card (step S601).

As a result of the determination in the step S601, when the near-field wireless communication device is a contactless card, the CPU 201 reads a user identification number from the contactless card and performs user authentication based on the user identification number (step S602). Next, the CPU 201 determines whether or not the user authentication is successful (step S603). In the step S603, when the user identification number is registered in a database (not shown) stored in the HDD 210, the CPU 201 determines that the user authentication is successful. On the other hand, when the user identification number is not registered in the database, the CPU 201 determines that the user authentication is unsuccessful. It should be noted that in the present embodiment, the user may be notified of the user authentication result by lighting up the NFC communication area 301 in red when the user authentication is unsuccessful and lighting up the NFC communication area 301 in green when the user authentication is successful.

As a result of the determination in the step S603, when the CPU 201 determines that the user authentication is unsuccessful, the process returns to the step S601. As a result of the determination in the step S603, when the user authentication is successful, the CPU 201 checks a state of the MFP 11. The CPU 201 also identifies a job corresponding to the user identification number from the jobs submitted to the MFP 11 (step S604). Based on the state of the MFP 11 and a type of the identified job, the CPU 201 controls lighting of the copy LED 309, the scan LED 310, and the print LED 311. For example, when the MFP 11 is in a normal state, the CPU 201 lights up the copy LED 309 and the scan LED 310 and notifies the user that copying and scanning are ready to be performed. On the other hand, when the MFP 11 is in an abnormal state, the CPU 201 lights up neither the copy LED 309 nor the scan LED 310. Moreover, when the identified job is a print job in which reservation printing is performed, the CPU 201 lights up the print LED 311 and notifies the user that the print job is ready to be executed. On the other hand, when the identified job is not the print job in which reservation printing is performed, the CPU 201 does not light up the print LED 311. In the present embodiment, the MFP 11 does not accept an instruction issued by depressing an operating button corresponding to the LED that does not light up. Then, the CPU 201 determines whether or not user-specific setting information corresponding to the identified job is registered in the user setting management information 1001 (step S605).

Figure 9:
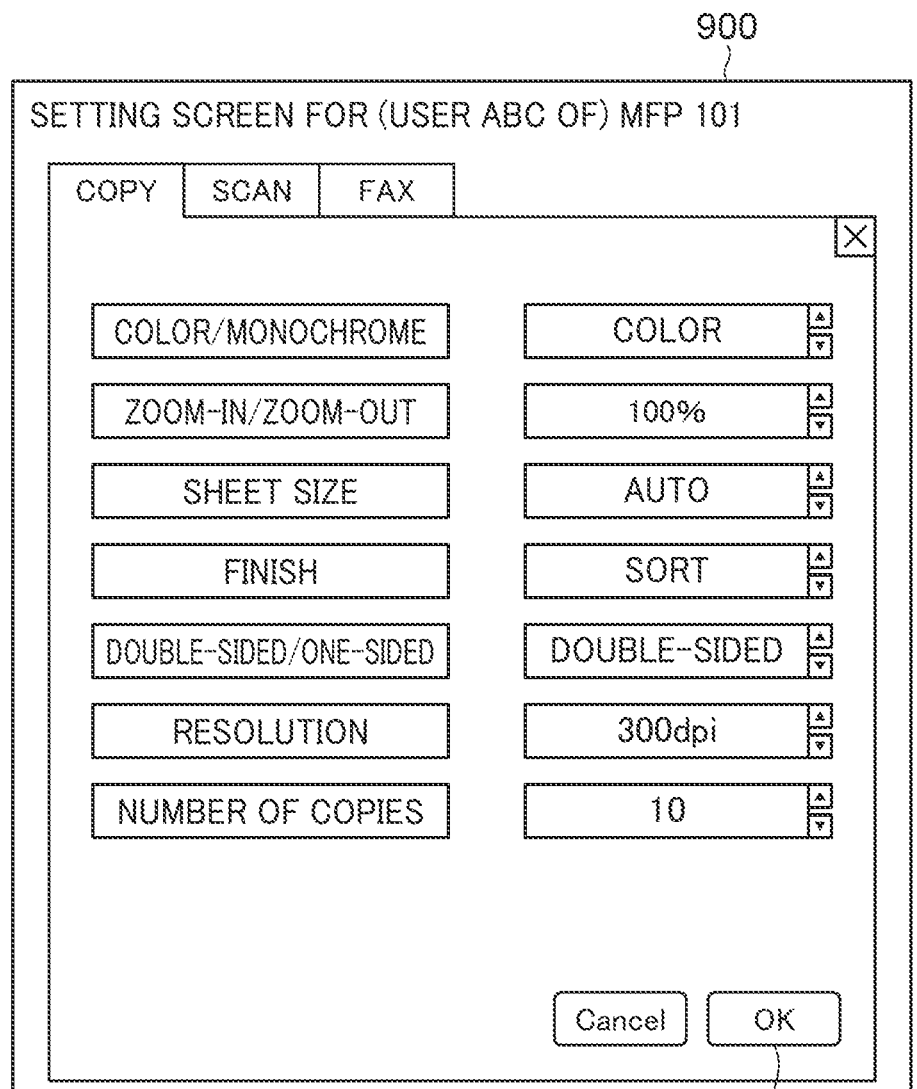
FIG. 9 is a view showing an example of a user-specific setting registration screen which is displayed on the PC in FIG. 1.

In the present embodiment, each user is able to use the PC 13 or the like to register in advance not only default information common to all users but also setting information specific to each user (hereafter referred to as "user-specific setting information") as setting information configured in job setting information. When the user successfully performs authentication using the PC 13, a user-specific setting registration screen 900 in FIG. 9 is displayed on the PC 13. As with the default setting registration screen 700, the user-specific setting registration screen 900 is displayed on the web browser of the PC 13. The user uses the user-specific setting registration screen 900 to register and change user-specific setting information with respect to each of job types such as copying, scanning, and printing. On the user-specific setting registration screen 900, the same items of user-specific setting information as those on the default setting registration screen 700 are registered. When setting values for the respective items are input, and an OK button 901 is selected, the input setting values are registered in the user setting management information 1001. The user setting management information 1001 manages user-specific setting information with respect to each user. As with the default setting management information 801, the user setting management information 1001 is managed by the MFP 11 and stored in the flash ROM 212 of the MFP 11.

For example, when the identified job is "Copy Job" and the user identification number is "001", user-specific setting information 1002 satisfying these conditions is registered as the user setting management information 1001. In this case, the CPU 201 determines in the step S605 that user-specific setting information for the identified job is registered in the user setting management information 1001. On the other hand, when the identified job is "Copy Job" and the user identification number is "003", no user-specific setting information satisfying these conditions is registered in the user setting management information 1001. In this case, the CPU 201 determines that no user-specific setting information for the identified job is registered in the user setting management information 1001.

As a result of the determination in the step S605, when user-specific setting information for the identified job is registered in the user setting management information 1001, the CPU 201 sets the user-specific setting information in job setting information (step S606). Then, the CPU 201 blinks an LED of an operating button for the identified job, for example, the copy LED 309 (step S607). After that, the CPU 201 carries out a process in the step S609, to be described later.

As a result of the determination in the step S605, when no user-specific setting information for the identified job is registered in the user setting management information 1001, the CPU 201 obtains default information corresponding to a type of the identified job from the default setting management information 801. The CPU 201 sets the obtained default information in the job setting information (step S608). It should be noted that when the default information is set in the job setting information, the CPU 201 continues to light up the operating button for the identified job. Thus, in the present embodiment, according to a state of the operating button, and more specifically, whether the LED lights up or blinks, the user is able to know whether the user-specific setting information or the default information is set. Then, the CPU 201 determines whether or not depression of the copy button 303 is detected while the copy LED 309 lights up (step S609).

As a result of the determination in the step S609, when depression of the copy button 303 has been detected, the CPU 201 carries out a copying process in FIG. 11, to be describe later (step S610), and the process returns to the step S604. As a result of the determination in the step S609, when depression of the copy button 303 has not been detected, the CPU 201 determines whether or not depression of the scan button 304 has been detected while the scan LED 310 lights up (step S611).

As a result of the determination in the step S611, when depression of the scan button 304 has been detected, the CPU 201 carries out a scanning process in FIG. 12, to be describe later (step S612), and the process returns to the step S604. As a result of the determination in the step S611, when depression of the scan button 304 has not been detected, the CPU 201 determines whether or not depression of the print button 305 has been detected while the print LED 311 lights up (step S613).

As a result of the determination in the step S613, when depression of the print button 305 has been detected, the CPU 201 carries out a printing process (step S614), and the process returns to the step S604. It should be noted that when a print job in which reservation printing is not performed is submitted, the CPU 201 carriers out the printing process when user authentication is successful. As a result of the determination in the step S613, when depression of the print button 305 has not been detected, the CPU 201 determines whether or not depression of the mobile button 308 has been detected while the mobile LED 313 lights up (step S615).

As a result of the determination in the step S615, when depression of the mobile button 308 has been detected, the CPU 201 provides notification about the network information on the MFP 11 (step S616), and the process returns to the step S604. As a result of the determination in the step S615, when depression of the mobile button 308 has not been detected, the CPU 201 determines whether or not depression of the cancel button 306 has been detected (step S617).

As a result of the determination in the step S617, when depression of the cancel button 306 has been detected, the CPU 201 carries out a cancellation process in FIGS. 14A and 14B, to be describe later (step S618), and the process returns to the step S604. As a result of the determination in the step S617, when depression of the cancel button 306 has not been detected, the CPU 201 determines whether or not depression of the end/logout button 307 has been detected (step S619).

As a result of the determination in the step S619, when depression of the end/logout button 307 has not been detected, the process returns to the step S604. As a result of the determination in the step S619, when depression of the end/logout button 307 has been detected, the CPU 201 carries out a logout process (step S620), and the process returns to the step S601.

As a result of the determination in the step S601, when the near-field wireless communication device is a mobile terminal, the CPU 201 carries out a handover process in FIG. 15, to be describe later (step S621), and the process returns to the step S601.

According to the embodiment described above, in the MFP 11 that is not able to directly edit job setting information, when user-specific setting information corresponding to a user identification number of a user who has logged into the MFP 11 and corresponding to a type of a submitted job is registered in the user setting management information 1001, the user-specific setting information is set in job setting information. Thus, desired job setting information is set without the need to set job setting information using the PC 13 each time a job is executed. This prevents degradation of operability associated with setting of job setting information.

Moreover, according to the embodiment described above, when user-specific setting information corresponding to a user identification number of a user who has logged into the MFP 11 and corresponding to a type of a submitted job is not registered in the user setting management information 1001, default information is set as job setting information. Thus, for execution of a job that does not require setting of specific job setting information, job setting information is easily set without the need to perform setting operations using the PC 13 each time a job is executed.

Furthermore, according to the embodiment described above, lighting modes of LEDs of operating buttons vary according to whether user-specific setting information or default information is set as job setting information. Thus, the MFP 11 equipped with no display unit that displays job setting information is able to notify a user about whether user-specific setting information or default information is set as job setting information.

Figure 11:
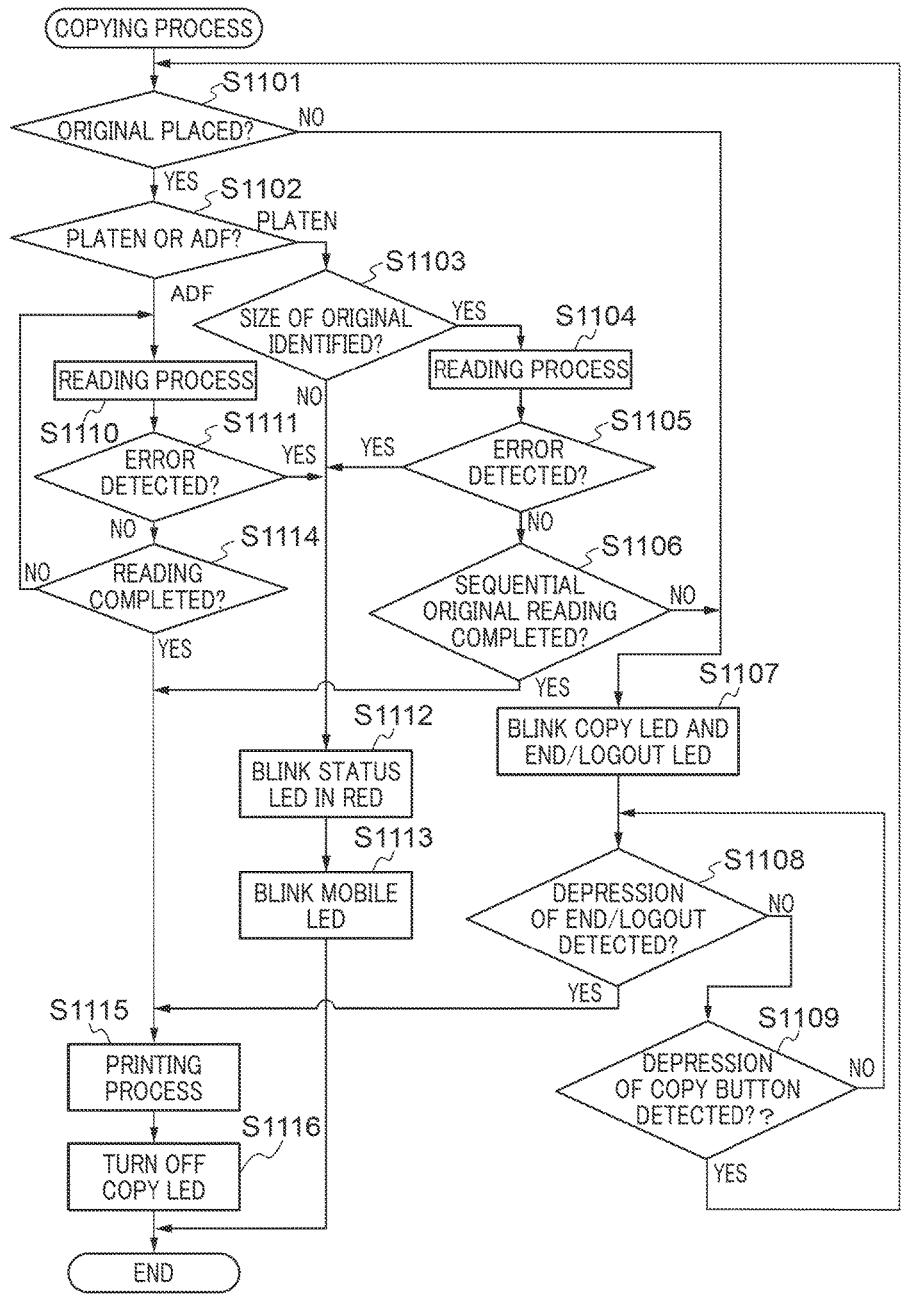
FIG. 11 is a flowchart showing the procedure of a copying process in step S610 in FIG. 6B.

FIG. 11 is a flowchart showing the procedure of the copying process which is carried out in the step S610 in FIG. 6B.

Referring to FIG. 11, the CPU 201 determines whether or not an original is placed on the scanner 207 (step S1101).

As a result of the determination in the step S1101, when an original is placed on the scanner 207, the CPU 201 determines whether the original is placed on a platen (not shown) or an ADF (auto document feeder) (not shown) of the scanner 207 (step S1102).

As a result of the determination in the step S1102, when the original is placed on the platen (not shown), the CPU 201 determines whether or not a size of the original has been identified (step S1103).

As a result of the determination in the step S1103, when the size of the original has been identified, the CPU 201 carries out a process in which it reads the original placed on the platen (step S1104). The CPU 201 generates a scanned image of the original that has been read and stores the generated scanned image in the DRAM 202. Then, the CPU 201 determines whether or not an error such as a paper jam has been detected (step S1105).

As a result of the determination in the step S1105, when no error has been detected, the CPU 201 determines whether or not sequential original reading has been completed (step S1106). In the MFP 11, for example, when double-sided printing is set for the original placed on the platen, it is necessary to read both a front surface and a rear surface of the original. In this case, in the step S1106, only when reading of both the front surface and the rear surface has been completed, it is determined that the sequential original reading has been completed.

As a result of the determination in the step S1106, when the sequential original reading has not been completed, the CPU 201 blinks the copy LED 309 and the end/logout LED 312 (step S1107). Thus, the MFP 11 prompts the user to place the next original, for example, turn over the original or issues an instruction to start a process subsequent to the reading process. It should be noted that in the step S1107, an audio guidance for informing the user about the meaning of blinking may be output from the speaker 408. Then, the CPU 201 determines whether or not depression of the end/logout button 307, which is used for issuing the instruction to start the process subsequent to the reading process, has been detected (step S1108).

As a result of the determination in the step S1108, when depression of the end/logout button 307 has not been detected, the CPU 201 detects whether or not depression of the copy button 303 has been detected (step S1109).

As a result of the determination in the step S1109, when depression of the copy button 303 has not been detected, the process returns to the step S1108. As a result of the determination in the step S1109, when depression of the copy button 303 has been detected, the process returns to the step S1101, in which the next original is read.

As a result of the determination in the step S1102, when an original is placed on the ADF, the CPU 201 conveys the original placed on the ADF to a reading unit (not shown) of the scanner 207 and carries out a process to read the original (step S1110). The CPU 201 generates a scanned image of the original that has been read and stores the generated scanned image in the DRAM 202. Then, the CPU 201 determines whether or not an error such as a paper jam has been detected (step S1111).

As a result of the determination in the step S1103, when the size of the original has not been identified, or as a result of the determination in the step S1105 or S1111, when an error has been detected, the CPU 201 blinks the status LED 302 in red (step S1112). It should be noted that in the step S1112, an alarming sound or an audio guidance for informing the user about the meaning of blinking may be output from the speaker 408. Then, the CPU 201 blinks the mobile LED 313 (step S1113) and prompts a user to connect a mobile terminal. It should be noted that as in the step S1112, an audio guidance for informing the user about the meaning of blinking may be output from the speaker 408 in the step S1113. After that, the CPU 201 ends the present process.

As a result of the determination in the step S1111, when no error has been detected, the CPU 201 determines whether or not reading of all the originals placed on the ADF has been completed (step S1114).

As a result of the determination in the step S1114, when any of all originals placed on the ADF has not completely been read, the process returns to the process in the step S1110.

As a result of the determination in the step S11106, when the sequential original reading has been completed, as a result of the determination in the step S1108, when depression of the end/logout button 307 has been detected, or as a result of the determination in the step S1114, reading of all the originals placed on the ADF has been completed, the CPU 201 carries out a printing process for generated scanned images (step S1115). In the step S1115, the CPU 201 causes the image processing unit 211 to convert the scanned images stored in the DRAM 202 into image data for use in the printing process and prints the image data on sheets. Then, the CPU 201 turns off the copy LED 309 (step S1116) and ends the present process.

Figure 12:
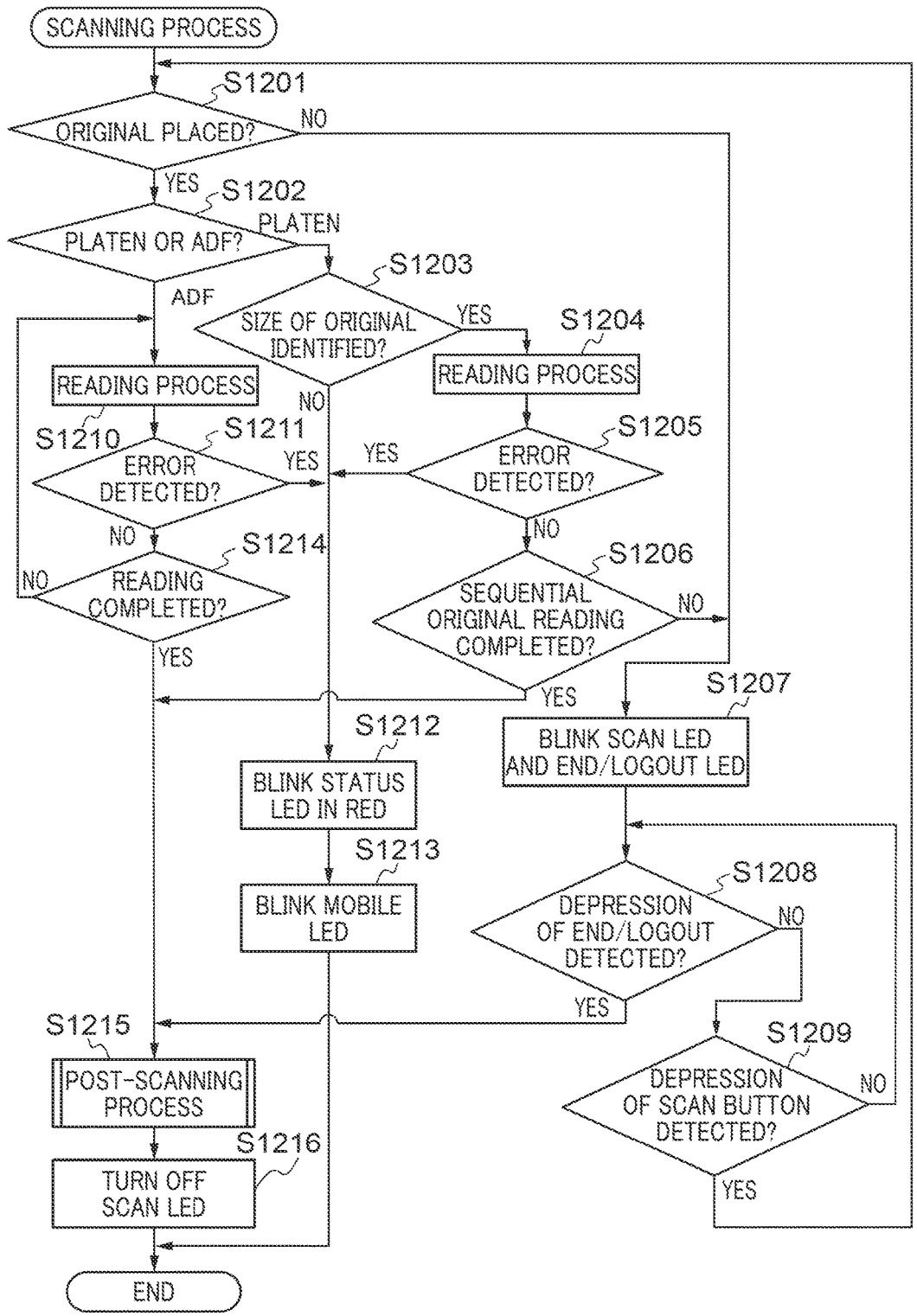
FIG. 12 is a flowchart showing the procedure of a scanning process in step S612 in FIG. 6B.

FIG. 12 is a flowchart showing the procedure of the scanning process which is carried out in the step S612 in FIG. 6B.

Referring to FIG. 12, the CPU 201 carries out processes in steps S1201 to S1206, which are the same as those in the steps S1101 to S1106.

As a result of the determination in the step S1206, when the sequential original reading has not been completed, the CPU 201 blinks the scan LED 310 and the end/logout button 312 (step S1207). Thus, the MFP 11 prompts the user to place the next original, for example, turn over the original or issues an instruction to start a process subsequent to the reading process. Then, the CPU 201 determines whether or not depression of the end/logout button 307, which is used for issuing the instruction to start the process subsequent to the reading process, has been detected (step S1208).

As a result of the determination in the step S1208, when depression of the end/logout button 307 has not been detected, the CPU 201 determines whether or not depression of the scan button 304 has been detected (step S1209).

As a result of the determination in the step S1209, when depression of the scan button 304 has not been detected, the process returns to the step S1208. As a result of the determination in the step S1209, when depression of the scan button 304 has been detected, the process returns to the step S1201, in which the next original is read.

As a result of the determination in the step S1202, when an original is placed in the ADF, the CPU 201 carries out processes in steps S1210 to S1213, which are the same as those in the steps S1110 to S1113. As a result of the determination in the step S1211, when no error has been detected, the CPU 201 carries out a process in step S1214, which is the same as that in the step S1114.

As a result of the determination in the step S1206, when the sequential original reading has been completed, as a result of the determination in the step S1208, when depression of the end/logout button 307 has been detected, or as a result of the determination in the step S1214, reading of all the originals placed on the ADF has been completed, the CPU 201 carries out a post-scanning process in FIG. 13, to be described later (step S1215). Then, the CPU 201 turns off the scan LED 310 (step S1216) and ends the present process.

Figure 13:
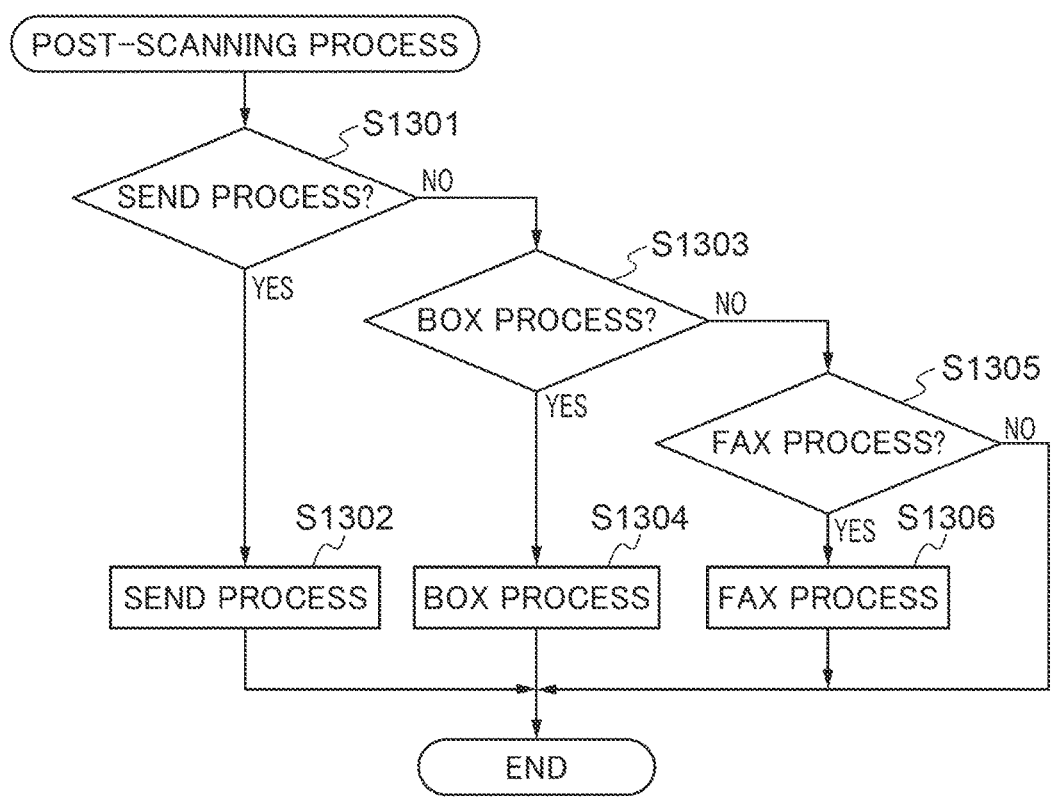
FIG. 13 is a flowchart showing the procedure of a post-scanning process in step S1215 in FIG. 12.

FIG. 13 is a flowchart showing the procedure of the post-scanning process which is carried out in the step S1215 in FIG. 12. The process in FIG. 13 is based on the assumption that any of a Send process, a Box process, and a Fax process is set in job setting information on a scan job. In the Send process, a scanned image is converted into PDF data, which in turn is transmitted to a set destination address by e-mail. In the Box process, a scanned image is converted into PDF data, which in turn is stored in the HDD 210. In the Fax process, a scanned image is faxed to a set destination address.

Referring to FIG. 13, the CPU 201 determines whether or not the Send process is set in the job setting information (step S1301).

As a result of the determination in the step S1301, when the Send process is set in the job setting information, the CPU 201 carries the Send process (step S1302) and ends the present process. As a result of the determination in the step S1301, when the Send process is not set in the job setting information, the CPU 201 determines whether or not the Box process is set in the job setting information (step S1303).

As a result of the determination in the step S1303, when the Box process is set in the job setting information, the CPU 201 carries out the Box process (step S1304) and ends the present process. As a result of the determination in the step S1303, when the Box process is not set in the job setting information, the CPU 201 determines whether or not the Fax process is set in the job setting information (step S1305).

As a result of the determination in the step S1305, when the Fax process is set in the job setting information, the CPU 201 carries the Fax process (step S1306) and ends the present process. As a result of the determination in the step S1305, when the Fax process is not set in the job setting information, the CPU 201 ends the present process.

Figure 14A:
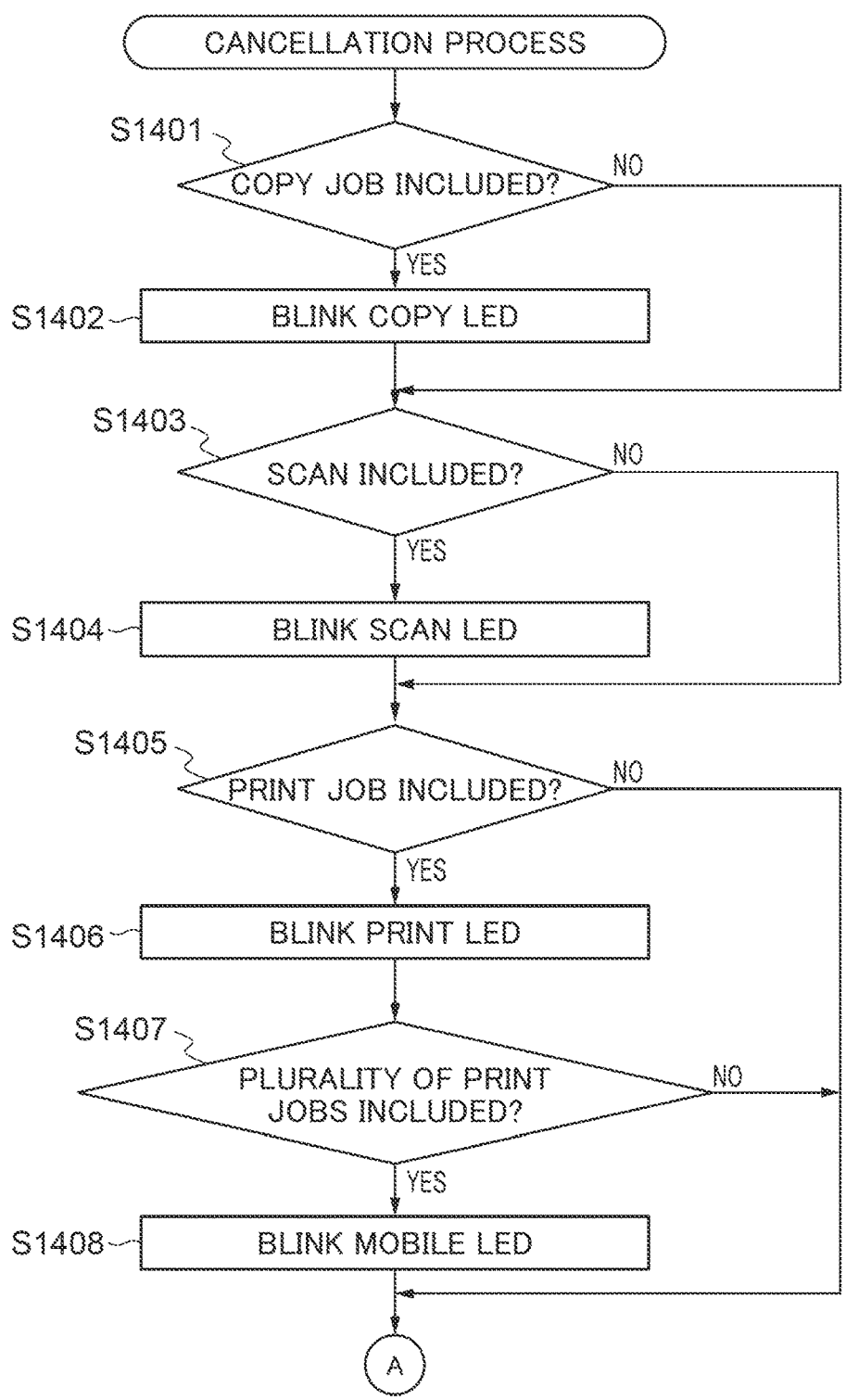
FIG. 14A is a flowchart showing the procedure of a cancellation process in step S618 in FIG. 6B.
Figure 14B:
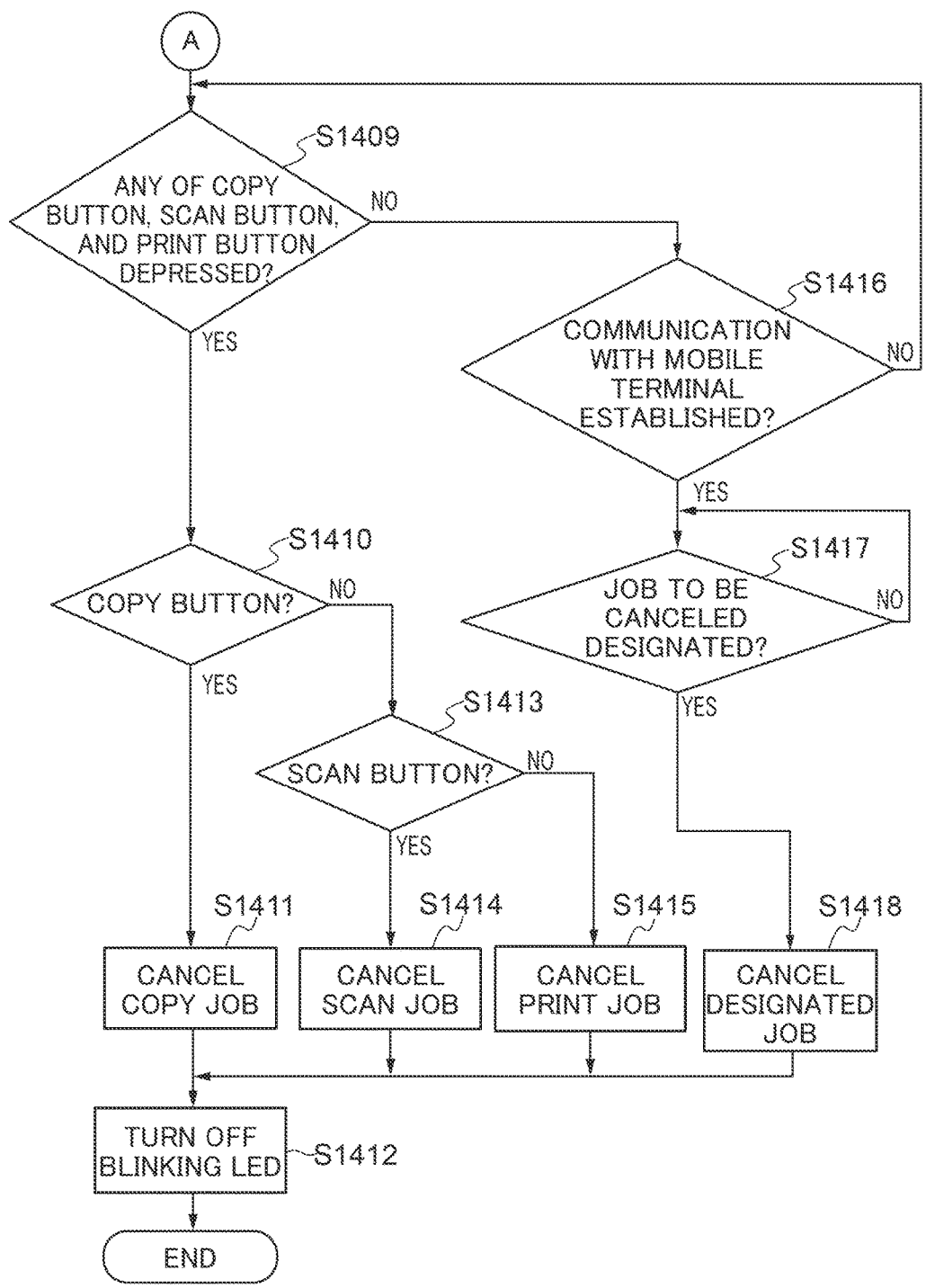
FIG. 14B is a flowchart showing the procedure of the cancellation process in the step S618 in FIG. 6B.

FIGS. 14A and 14B are flowcharts showing the procedure of the cancellation process which is carried out in the step S618 in FIG. 6B.

Referring to FIGS. 14A and 14B, the CPU 201 determines whether or not a copy job is included in the jobs submitted to the MFP 11 (step S1401).

As a result of the determination in the step S1401, when no copy job is included in the submitted jobs, the CPU 201 carries out a process in step S1403, to be described later. As a result of the determination in the step S1401, when a copy job is included in the submitted jobs, the CPU 201 blinks the copy LED 309 (step S1402) and determines whether or not a scan job is included in the submitted jobs (step S1403).

As a result of the determination in the step S1403, when no scan job is included in the submitted jobs, the CPU 201 carries out a process in step S1405, to be described later. As a result of the determination in the step S1403, when a scan job is included in the submitted jobs, the CPU 201 blinks the scan LED 310 (step S1404) and determines whether or not a print job is included in the submitted jobs (step S1405).

As a result of the determination in the step S1405, when no print job is included in the submitted jobs, the CPU 201 carries out a process in step S1409, to be described later. As a result of the determination in the step S1405, when a print job is included in the submitted jobs, the CPU 201 blinks the print LED 311 (step S1406) and determines whether or not a plurality of print job is included in the submitted jobs (step S1407).

As a result of the determination in the step S1407, when a plurality of print job is not included in the submitted jobs, the CPU 201 carries out the process in step S1409, to be described later. As a result of the determination in the step S1407, when a plurality of print job is included in the submitted jobs, the CPU 201 blinks the mobile LED 313 (step S1408). It should be noted that the notifications provided to the user in the steps S1402, S1404, S1406, and S1408 are different from the notification indicated by blinking in the step S607, and hence blinking in the steps S1402, S1404, S1406, and S1408 is controlled so as not to be the same as blinking in the step S607. For example, in the steps S1402, S1404, S1406, and S1408, the LEDs blink at different time intervals from those in the step S607. Then, the CPU 201 determines whether or not any of the copy button 303, the scan button 304, and the print button 305 has been depressed among the operating buttons corresponding to the LEDs (step S1409).

As a result of the determination in the step S1409, when any of the copy button 303, the scan button 304, and the print button 305 has been depressed, the CPU 201 determines whether or not the depressed operating button is the copy button 303 (step S1410).

As a result of the determination in the step S1410, when the depressed operating button is the copy button 303, the CPU 201 cancels all of copy jobs among the submitted jobs (step S1411). Then, the CPU 201 turns off the blinking LED (step S1412) and ends the present process.

As a result of the determination in the step S1410, when the depressed operating button is not the copy button 303, the CPU 201 determines whether or not the depressed operating button is the scan button 304 (step S1413).

As a result of the determination in the step S1413, when the depressed operating button is the scan button 304, the CPU 201 cancels all of scan jobs among the submitted jobs (step S1414) and carries out the processes in the step S1412 and the subsequent steps. As a result of the determination in the step S1413, when the depressed operating buttons is not the scan button 304, the CPU 201 cancels all of print jobs among the submitted jobs (step S1415) and carries out the processes in the step S1412 and the subsequent steps.

As a result of the determination in the step S1409, when none of the copy button 303, the scan button 304, and the print button 305 has been depressed, the CPU 201 determines whether or not a communication with the mobile terminal 15 has been established (step S1416).

As a result of the determination in the step S1416, when a communication with the mobile terminal 15 has not been established, the process returns to the step S1409. As a result of the determination in the step S1416, when a communication with the mobile terminal 15 has been established, and also, a job to be canceled has been designated by the mobile terminal 15 (YES in step S1417), the CPU 201 cancels the designated job (step S1418). Then, the CPU 201 carries out the processes in the step S1412 and the subsequent steps.

Figure 15:
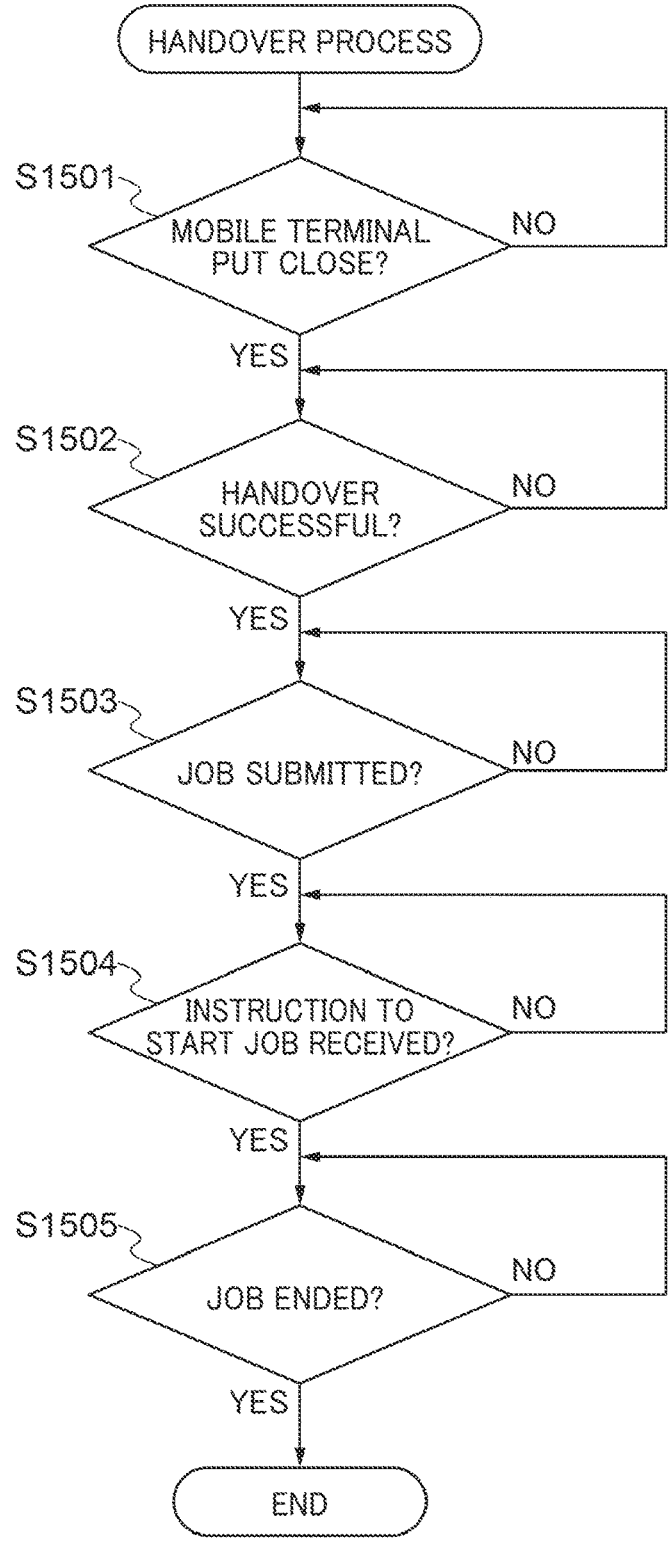
FIG. 15 is a flowchart showing the procedure of a handover process in step S621 in FIG. 6A.

FIG. 15 is a flowchart showing the procedure of the handover process which is carried out in the step S621 in FIG. 6A.

Referring to FIG. 15, upon detecting the mobile terminal 15 put close to the NFC communication area 301 (YES in step S1501), the CPU 201 waits for a handover to be successful. In the handover, the mobile terminal 15 reads network information from the NFC tag 405, and based on the read network information, the mobile terminal 15 establishes a communication with the MFP 11. This enables the mobile terminal 15 to carry out a wireless communication with the MFP 11 at a higher speed than a near-field wireless communication. Next, when the handover is successful (YES in step S1502), the CPU 201 waits for a job to be submitted from the mobile terminal 15. The user is able to submit a job to the MFP 11 using the setting screen 1600 in FIG. 16, which is displayed on the mobile terminal 15. The user selects Scan 1602 in Select Mode 1601, and in Set Address 1603, sets a transmission destination of a scanned image. When a job is submitted from the mobile terminal 15 (YES in step S1503), and an instruction to start execution of the job is received from the mobile terminal 15, the CPU 201 starts executing the job. After that, when the job is finished (YES in step S1505), the CPU 201 ends the present process.

It should be noted that a one-time setting function may be provided for job setting information.

For example, when the user uses setting information different from setting information registered in the default setting management information 801 or the user setting management information 1001 for the execution of a specific job, the user needs to edit the user setting management information 1001 a plurality of times. Specifically, the user needs to use the PC 13 to change user-specific setting information in the user setting management information 1001 to desired setting information, and further, after execution of a job based on the changed setting information is completed, the user-specific setting information needs to be reset to the original setting information, which involves a lot of time and effort.

Accordingly, in the present embodiment, the one-time setting function is provided for job setting information.

Figure 17:
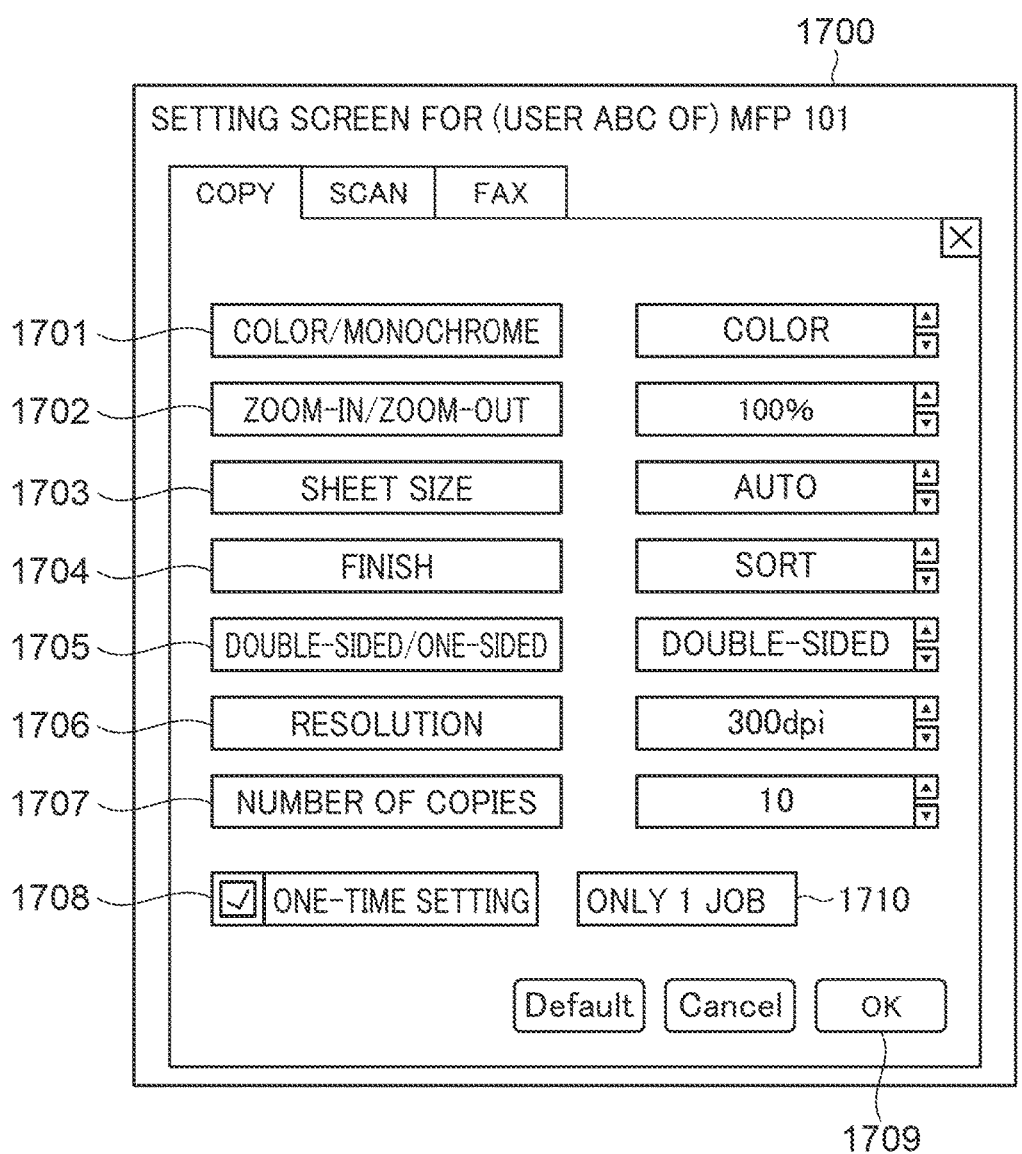
FIG. 17 is a view showing an example of a user-specific setting registration screen which is displayed on the PC in FIG. 1.

When the user successfully performs user authentication using the PC 13, a user-specific setting registration screen 1700 in FIG. 17 is displayed on the PC 13. By means of the user-specific setting registration screen 1700, the user is able to register one-time setting information (temporary setting information) as well as user-specific setting information. On the user-specific setting registration screen 1700, setting values are entered in items 1701 to 1707, and when the user selects an OK button 1709 with a checkbox 1708 on, the one-time setting function is enabled. When the one-time setting function is enabled, the setting values entered in the items 1701 to 1707 are temporarily stored as one-time setting information in the flash ROM 212 or the like without being registered in the user setting management information 1001. In a setting field 1710, a time period for which one-time setting information is held is set. For example, "Only One Job" for holding one-time setting information until execution of a single job is completed, and "Log Out" for holding one-time setting information until the user logs out are set in the setting field 1710.

Figure 18A:
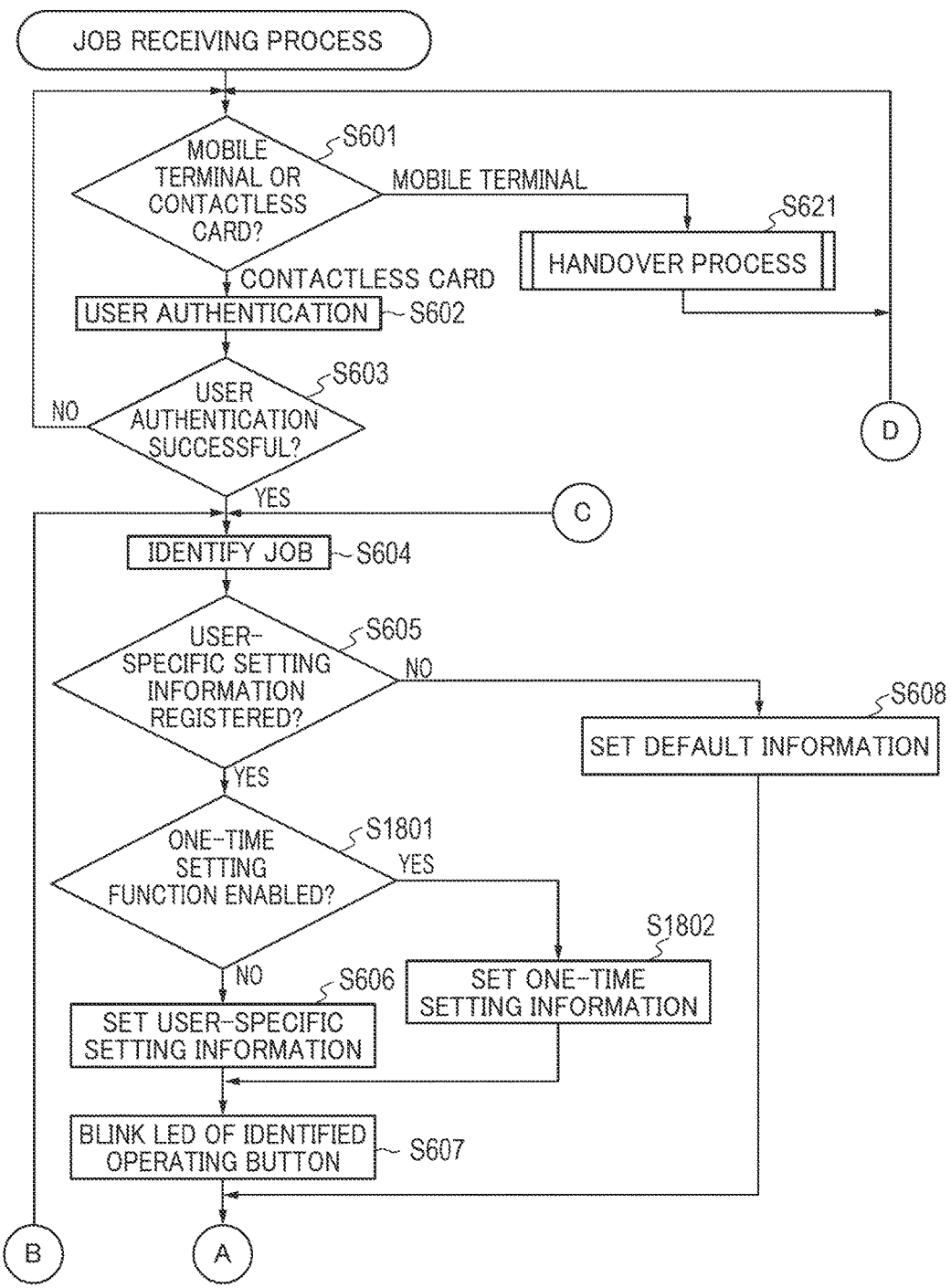
FIGS. 18A and 18B is a flowchart showing the procedure of a variation of the job receiving process in FIGS. 6A and 6B.
Figure 18B:
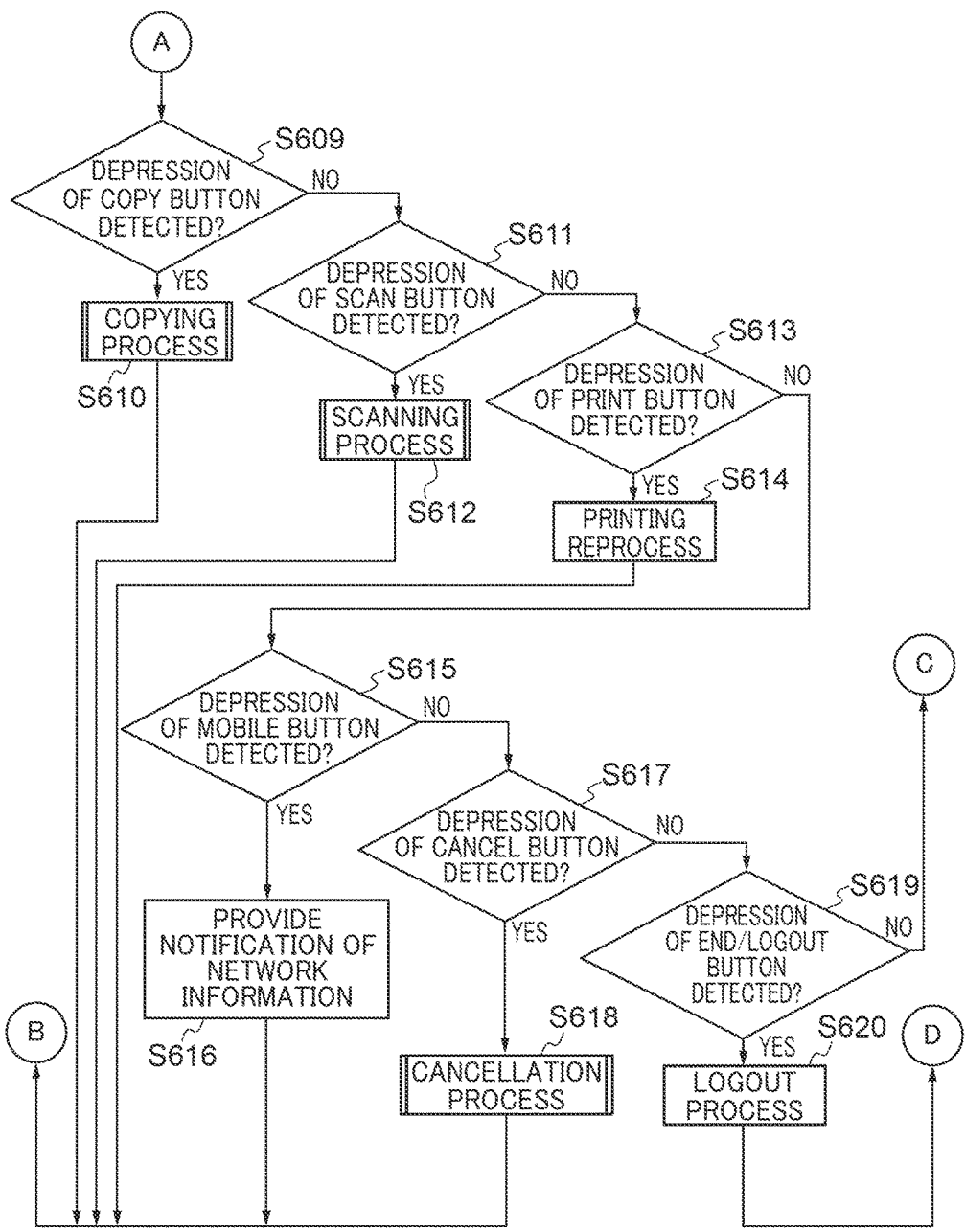

FIGS. 18A and 18B is a diagram schematically showing a variation of the procedure of the job receiving process in FIGS. 6A and 6B.

As with the process in FIGS. 6A and 6B, the process in FIGS. 18A and 18B is carried out by the CPU 201 executing programs stored in the flash ROM 212 when the CPU 201 detects a near-field wireless communication device put close to the NFC communication area 301.

Referring to FIGS. 18A and 18B, the CPU 201 carries out the processes in the steps S601 to S605 and S621.

As a result of the determination in the step S605, when the user-specific setting information on the identified job is not registered in the user setting management information 1001, the CPU 201 carries out the processes in the step S608 and the subsequent steps. As a result of the determination in the step S605, when the user-specific setting information on the identified job is registered in the user setting management information 1001, the CPU 201 determines whether or not the one-time setting function is enabled (step S1801).

As a result of the determination in the step S1801, when the one-time setting function is not enabled, the CPU 201 carries out the processes in the step S606 and the subsequent steps. As a result of the determination in the step S1801, when the one-time setting function is enabled, the CPU 201 sets the one-time setting information stored in the ROM 212 as the job setting information (step S1802). Namely, in the present embodiment, when one-time setting information corresponding to a user identification number of a user who has logged into the MFP 11 and corresponding to a type of a submitted job is registered, the one-time setting information is set as the job setting information. The one-time setting information is deleted from the flash ROM 212 when the condition set in the setting field 1710 is satisfied, for example, when execution of the job has been completed or when the user has logged out. Then, the CPU 201 carries out the processes in the step S607 and the subsequent steps.

In the embodiment described above, when one-time setting information corresponding to user identification number of a user who has logged into the MFP 11 and corresponding to a type of a submitted job is registered, the one-time setting information is set as the job setting information. The one-time setting information is unregistered when the predetermined condition is satisfied. Namely, the user does not have to edit the user setting management information 1001 when executing a job based on setting information other than setting information registered in the default setting management information 801 or the user setting management information 1001. This saves the user time and trouble associated with setting of job setting information when only a certain job is executed based on the other setting information mentioned above.

Moreover, in the embodiment described the predetermined condition is that execution of one job is completed. This saves the user time and effort associated with setting of the job setting information when he or she wants to execute only one job based on the other setting information different from setting information registered in the default setting management information 801 or the user setting management information 1001.

Furthermore, in the embodiment described above, the predetermined condition is that the user logs out of the MFP 11. This saves the user time and effort associated with setting of the job setting information when he or she wants to sequentially execute a plurality of jobs based on the other setting information different from setting information registered in the default setting management information 801 or the user setting management information 1001.

In the embodiment described above, as with an operating unit 1900 in FIG. 19, there may be a fax button 1901 as well as the copy button 303, the scan button 304, and the print button 305. On the operating unit 1900, an LED 1902 is placed in such a manner as to cover a periphery of the fax button 1901. It should be noted that in the following description, the LED 1902 placed to cover the periphery of the fax button 1901 is referred to as the fax LED 1902. In the MFP 11, when the fax button 1901 is depressed, the faxing process in the step S1306 is carried out.

A description will now be given of a second embodiment of the present invention.

The second embodiment of the present invention is basically the same as the first embodiment described above in terms of constructions and operations. The second embodiment, however, differs from the first embodiment in that secure printing that requires input of a password when it is performed, and therefore, constructions and operations different from those of the first embodiment will be described below while constructions and operations corresponding to those in the first embodiment will not be described.

Figure 19:
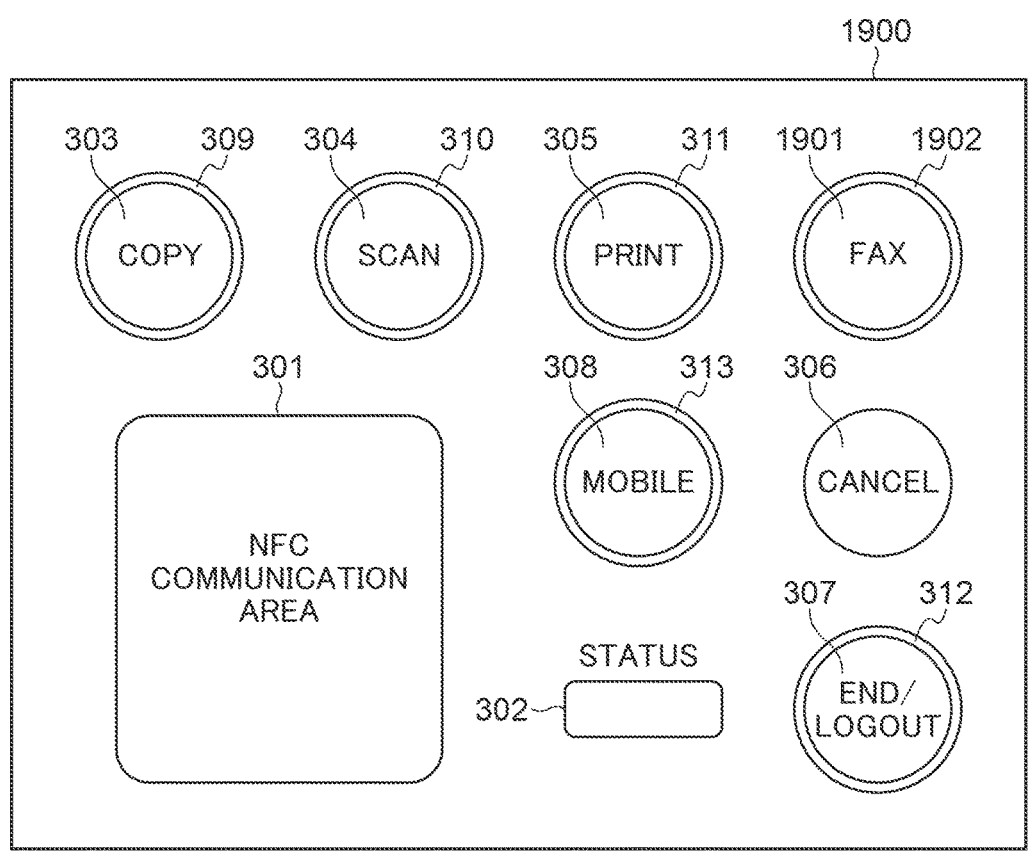
FIG. 19 is a diagram schematically showing a variation of the arrangement of the operating unit in FIG. 2.

When submitting a secure print job from the PC 13 or the like, the user sets a specific numeral string as a password. In a conventional MFP, when executing the submitted secure print job, the user enters a password by operating a 10-button keypad provided on the MFP, and when the entered password matches the set password, the secure print job is executed. On the other hand, since the operating unit 204 of the MFP 11 has no 10-button keypad as shown in FIGS. 3 and 19, the user cannot enter a password for executing the secure print job, and as a result, the secure print job cannot be executed.

To cope with this, in the present embodiment, the order in which operating buttons of the MFP 11 are depressed is used as a password for secure printing.

Figure 20:
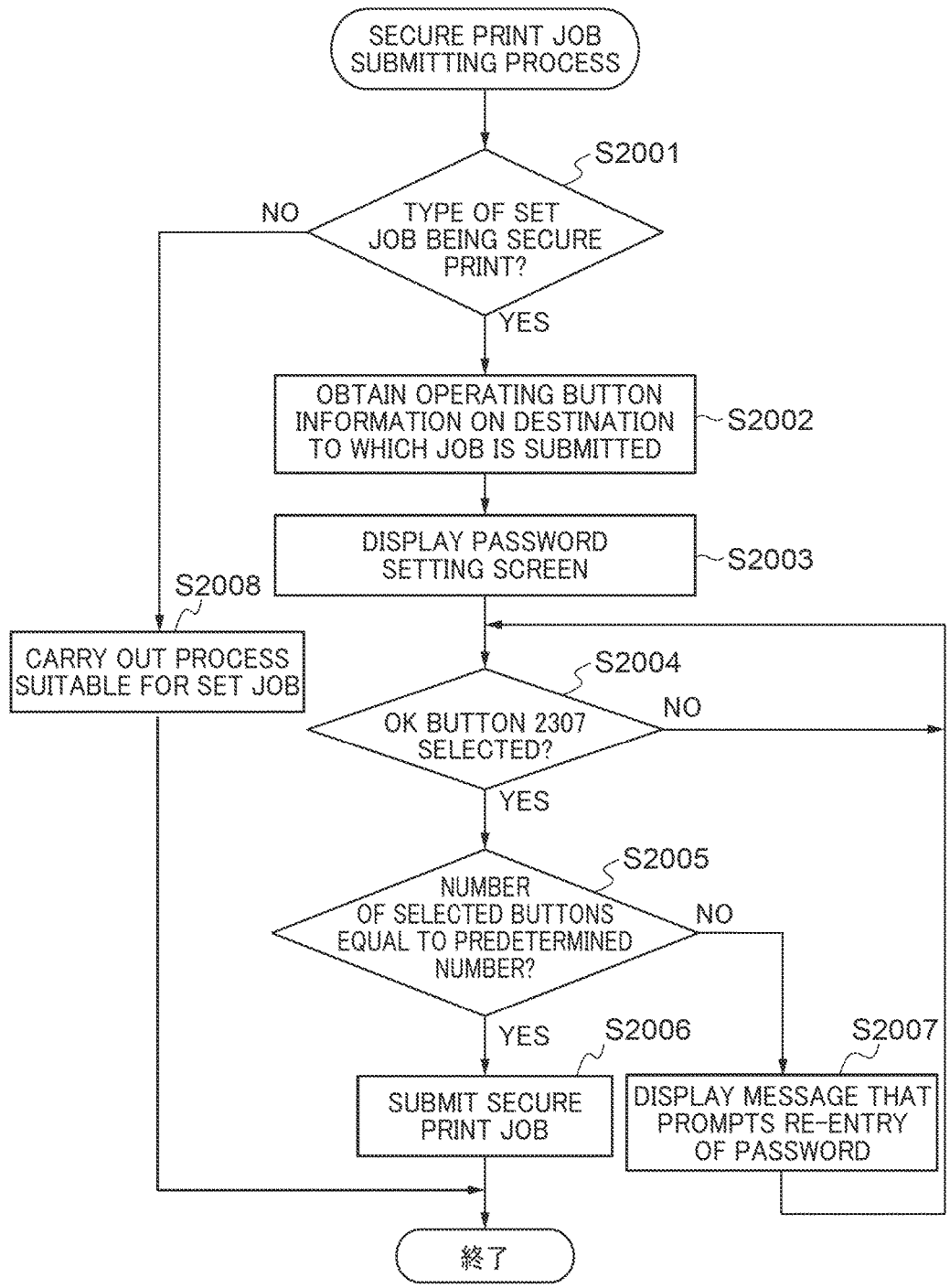
FIG. 20 is a flowchart showing the procedure of a secure print job submitting process which is carried out by the PC in FIG. 1.

FIG. 20 is a flowchart showing the procedure of a secure print job submitting process which is carried out by the PC 13 in FIG. 1.

The process in FIG. 20 is carried out when an OK button 2101 for issuing an instruction to submit a job is selected on a setting screen 2100 in FIG. 21A by the user. On the setting screen 2100, the user can select a destination to which the job is submitted from a pull-down menu 2102, and the user can also set detailed information on the job by selecting a detailed setting button 2103. When the detailed setting button 2103 is selected, a detailed setting screen 2104 in FIG. 21B is displayed on the PC 13. On the detailed setting screen 2104, the user can select job types such as a secure print job and a reservation print job from a pull-down menu 2105. The process in FIG. 20 is based on the assumption that operating button management information 2201 in FIG. 22 for managing types of operating buttons provided in each of apparatuses selectable from the pull-down menu 2102 is stored in the PC 13 in advance.

Referring to FIG. 20, the PC 13 determines whether or not a type of the set job is secure printing (step S2001).

Figure 23:
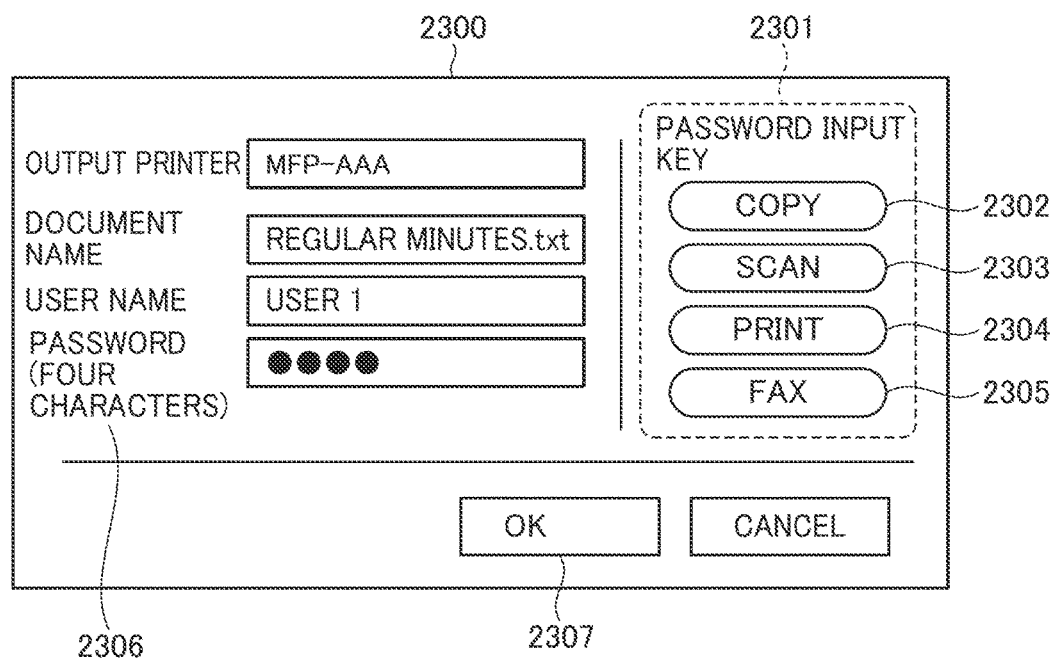
FIG. 23 is a view showing an example of a password setting screen which is displayed on the PC in FIG. 1.

As a result of the determination in the step S2001, when the type of the set job is secure printing, the PC 13 obtains operating button information on an apparatus to which the set job is submitted, for example, the MFP 11 from the operating button management information 2201 (step S2002). Then, the PC 13 displays a password setting screen 2300 in FIG. 23 on which a password for secure printing is set (step S2003). The password setting screen 2300 has a password input keypad 2301, a text box 2306, and an OK button 2307. On the password input keypad 2301, software buttons which represent respective operating buttons provided in the MFP 11, and more specifically, a copy button 2302, a scan button 2303, a print button 2304, a fax button 2305 are displayed based on the information obtained in the step S2002. The user sets the password by selecting the buttons on the password input keypad 2301. Namely, in the present embodiment, the order in which the buttons on the password input keypad 2301 are depressed is set as the password. Black circles corresponding to the buttons selected by the user on the password input keypad 2301 are displayed in the text box 2306. FIG. 23 shows an example in which four buttons are selected on the password input keypad 2301. When the OK button 2307 is selected, the settings on the password setting screen 2300 are confirmed.

Then, when the OK button 2307 is selected on the password setting screen 2300 (YES in the step S2004), the PC 13 determines whether or not the number of buttons selected on the password input keypad 2301 is equal to a predetermined number, for example, four (step S2005).

As a result of the determination in the step S2005, when the number of buttons selected on the password input keypad 2301 is equal to the predetermined number, the PC 13 submits the secure print job, for which the order in which the buttons on the password input keypad 2301 were depressed was set as the password, to the MFP 11 which is the destination of the job (step S2006). After that, the PC 13 ends the present process.

As a result of the determination in the step S2005, when the number of buttons selected on the password input keypad 2301 is not equal to the predetermined number, the PC 13 displays a message that prompts the user to enter a password again (step S2007), and the process returns to the step S2004.

As a result of the determination in the step S2001, when the type of the set job is not secure printing, the PC 13 carries out a process suitable for the set job (step S2008) and ends the present process.

Figure 24:
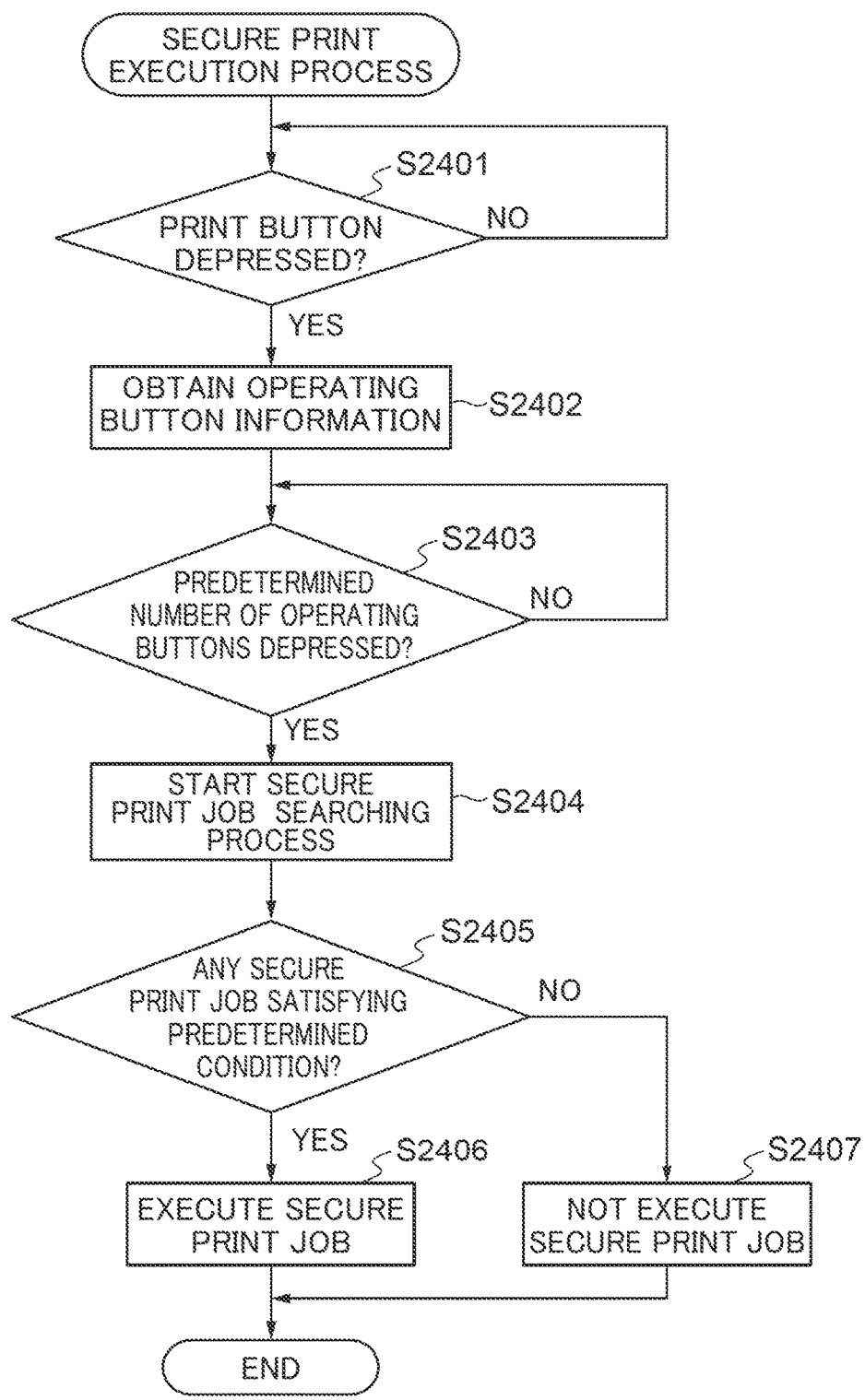
FIG. 24 is a flowchart showing the procedure of a secure print executing process which is carried out by the MFP in FIG. 1.

FIG. 24 is a flowchart showing the procedure of a secure print executing process which is carried out by the MFP 11 in FIG. 1.

As with the processes in FIGS. 6A, 6B, 18A and 18B, the process in FIG. 24 is implemented by the CPU 201 executing programs stored in the flash ROM 212. The process in FIG. 24 is carried out when a secure print job is submitted from the PC 13 or the like.

Referring to FIG. 24, first, when the print button 305 is depressed (YES in the step S2401), the CPU 201 obtains operating button information on the MFP 11, which is stored in the HDD 210 in advance (step S2402). The operating button information on the MFP 11 is information indicating types of the operating buttons provided in the MFP 11, and the same information is stored in operating button management information 2201 which is managed by the PC 13. Next, the CPU 201 lights up the LEDs of the operating buttons corresponding to the operating button information on the MFP 11, and more specifically, the copy LED 309, the scan LED 310, the print LED 311, and the fax LED 1902. The CPU 201 waits for the predetermined number of buttons mentioned above, for example, four operating buttons to be depressed among the operating buttons corresponding to the LEDs that light up. Then, when four operating buttons are depressed by the user (YES in the step S2403), the CPU 201 starts a process to retrieve a secure print job from jobs submitted to the MFP 11 (step S2404). After that, the CPU 201 determines whether or not there is any secure print job satisfying a predetermined condition in the jobs submitted to the MFP 11 (step S2405). Specifically, the CPU 201 determines whether or not there is any secure print job for which the order in which the operating buttons were depressed by the user was set as a password among the jobs submitted to the MFP 11.

As a result of the determination in the step S2405, when there is any secure print job for which the order in which the operating buttons were depressed by the user was set as a password, the CPU 201 executes the secure print job (step S2406) and ends the present process.

As a result of the determination in the step S2405, when there is no secure print job for which the order in which the operating buttons were depressed by the user was set as a password, the CPU 201 ends the present process without executing the jobs (step S2407).

In the embodiment described above, the order in which the operating buttons are depressed is used as a password for a secure print job. Thus, in the MFP 11 equipped with no 10-button keypad or the like, secure printing that requires input of a password can be executed.

Although in the embodiment described above, the user selects the order in which the operating buttons are depressed, which is a password for a secure print job, this is not limitative, but the PC 13 may decide the order in which the operating buttons are depressed. For example, the PC 13 sets an order different from the order in which the operating buttons were depressed and which was set for a secure print job submitted to the MFP 11 in the past, as a password. This prevents reuse of passwords which would result in degradation of security level.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-186774, filed Sep. 27, 2017, which is hereby incorporated by reference herein in its entirety.

What is claimed is:

1. An image forming apparatus that has an operation device which does not permit a user to edit job setting information directly, the job setting information being required to execute a submitted job, on the image forming apparatus, comprising:
a memory configured to store instructions; and
a processor configured to execute the instructions to:
set one of a predetermined device setting information which can be commonly used by users of the image forming apparatus or user-specific setting information, registered in the image forming apparatus, as the job setting information; and
execute the submitted job based on the set job setting information,
wherein, in a case where the user-specific setting information corresponding to identification information on a user who has logged into the image forming apparatus and corresponding to a type of the submitted job is registered in the image forming apparatus, the registered user-specific setting information is set as the job setting information,
wherein, in a case where the user-specific setting information is not registered in the image forming apparatus, the predetermined device setting information is set as the job setting information, and
wherein the image forming apparatus is configured to provide notification of whether the user-specific job setting information or the predetermined device setting information is set as the job setting information.

2. The image forming apparatus according to claim 1, further comprising:
a plurality of buttons associated with types of jobs,
wherein the processor is configured to execute further instructions to control lighting of the buttons associated with the submitted job among the plurality of buttons, and vary lighting modes of the buttons according to whether the user-specific setting information is set as the job setting information or the predetermined device setting information is set as the job setting information.

3. The image forming apparatus according to claim 1, wherein, in a case where temporary setting information corresponding to the identification information on the user who has logged into the image forming apparatus and the type of the submitted job is registered in the image forming apparatus, the temporary setting information is set as the job setting information, and the temporary setting information is unregistered when a predetermined condition is satisfied.

4. The image forming apparatus according to claim 3, wherein the predetermined condition is that execution of one job is completed.

5. The image forming apparatus according to claim 3, wherein the predetermined condition is that the user logs out of the image forming apparatus.

6. A control method of controlling an image forming apparatus that has an operation device which does not permit a user to edit job setting information directly, the job setting information being required to execute a submitted job, the control method comprising:
a setting step of setting one of a predetermined device setting information which can be commonly used by users of the image forming apparatus or user-specific setting information, registered in the image forming apparatus, as the job setting information; and
an execution step of executing the submitted job based on the set job setting information,
wherein, in a case where the user-specific setting information corresponding to identification information on a user who has logged into the image forming apparatus and corresponding to a type of the submitted job is registered in the image forming apparatus, the registered user-specific setting information is set as the job setting information in the setting step,
wherein, in a case where the user-specific setting information is not registered in the image forming apparatus, the predetermined device setting information is set as the job setting information in the setting step, and
wherein the image forming apparatus is configured to provide notification of whether the user-specific job setting information or the predetermined device setting information is set as the job setting information.

7. A non-transitory computer-readable storage medium storing a program for causing a computer to execute a control method of controlling an image forming apparatus that has an operation device which does not permit a user to edit job setting information directly, the job setting information being required to execute a submitted job, the control method comprising:
a setting step of setting one of a predetermined device setting information which can be commonly used by users of the image forming apparatus or user-specific setting information, registered in the image forming apparatus, as the job setting information; and
an execution step of executing the submitted job based on the set job setting information,
wherein, in a case where the user-specific setting information corresponding to identification information on a user who has logged into the image forming apparatus and corresponding to a type of the submitted job is registered in the image forming apparatus, the registered user-specific setting information is set as the job setting information in the setting step,
wherein, in a case where the user-specific setting information is not registered in the image forming apparatus, the predetermined device setting information is set as the job setting information in the setting step, and
wherein the image forming apparatus is configured to provide notification of whether the user-specific job setting information or the predetermined device setting information is set as the job setting information.

* * * * *